United States Patent
Blaker

(10) Patent No.: US 6,820,105 B2
(45) Date of Patent: Nov. 16, 2004

(54) ACCELERATED MONTGOMERY EXPONENTIATION USING PLURAL MULTIPLIERS

(75) Inventor: David M. Blaker, Chapel Hill, NC (US)

(73) Assignee: CyberGuard Corporation, Ft. Lauderdale, FL (US)

( * ) Notice: Subject to any disclaimer, the term of this patent is extended or adjusted under 35 U.S.C. 154(b) by 641 days.

(21) Appl. No.: 09/849,853

(22) Filed: May 4, 2001

(65) Prior Publication Data

US 2002/0010730 A1 Jan. 24, 2002

Related U.S. Application Data

(60) Provisional application No. 60/203,409, filed on May 11, 2000.

(51) Int. Cl.[7] .............................................. G06F 7/72
(52) U.S. Cl. ..................................... 708/491; 708/492
(58) Field of Search ................................ 708/491, 492

(56) References Cited

U.S. PATENT DOCUMENTS

| | | | |
|---|---|---|---|
| 5,274,707 A | 12/1993 | Schlafly ........................ 380/30 |
| 5,329,623 A | 7/1994 | Smith et al. ................. 395/275 |
| 5,513,133 A | 4/1996 | Cressel et al. ............... 364/754 |
| 5,742,530 A * | 4/1998 | Gressel et al. ............... 708/491 |
| 5,961,626 A | 10/1999 | Harrison et al. ............. 710/129 |
| 5,987,131 A | 11/1999 | Clapp |
| 6,061,706 A | 5/2000 | Gai et al. ..................... 708/491 |
| 6,081,895 A | 6/2000 | Harrison et al. ............. 713/189 |
| 6,085,210 A | 7/2000 | Buer ............................ 708/491 |
| 6,185,596 B1 | 2/2001 | Hadad et al. ................ 708/491 |
| 6,209,016 B1 | 3/2001 | Hobson et al. |
| 6,219,789 B1 | 4/2001 | Little et al. .................. 713/200 |
| 6,240,436 B1 * | 5/2001 | McGregor ................... 708/491 |
| 6,434,585 B2 * | 8/2002 | McGregor et al. .......... 708/491 |
| 6,691,143 B2 * | 2/2004 | Blaker ......................... 708/491 |
| 2001/0010077 A1 * | 7/2001 | McGregor et al. .......... 713/174 |
| 2002/0120658 A1 | 8/2002 | Chen et al. |

FOREIGN PATENT DOCUMENTS

| | | |
|---|---|---|
| EP | 0 531 158 A2 | 3/1993 |
| EP | 0 601 907 A2 | 6/1994 |
| EP | 0 656 709 A2 | 6/1995 |

OTHER PUBLICATIONS

Gutub et al. entitled *An Expandable Montgomery Modular Multiplication Processor*, Eleventh International Conference on Microelectronics, Nov. 22–24, 1999, pp. 173–176.

Tenca et al. entitled *A Scalable Architecture for Montgomery Multiplication*, First International Workshop, Cryptographic Hardware and Embedded Systems, Lecture Notes on Computer Science, vol. 1717, 1999, pp. 94–108.

Freking et al. entitled *Montgomery Modular Multiplication and Exponentiation in the Residue Number System*, Conference Record of the Thirty–Third Asilomar Conference Signals, Systems, and Computers, vol. 2, 1999, pp. 1312–1316.

(List continued on next page.)

*Primary Examiner*—D. H. Malzahn
(74) *Attorney, Agent, or Firm*—Myers Bigel Sibley & Sajovec

(57) ABSTRACT

Montgomery exponentiators and methods modulo exponentiate a generator (g) to a power of an exponent (e). The Montgomery exponentiators and methods include a first multiplier that is configured to repeatedly square a residue of the generator, to produce a series of first multiplier output values at a first multiplier output. A second multiplier is configured to multiply selected ones of the series of first multiplier output values that correspond to a bit of the exponent that is binary one, by a partial result, to produce a series of second multiplier output values at a second multiplier output. By providing two multipliers that are serially coupled as described above, Montgomery exponentiation can be accelerated.

43 Claims, 15 Drawing Sheets

OTHER PUBLICATIONS

Menezes et al., Chapter 14, *Efficient Implementation, Handbook of Applied Cryptography*, CRC Press, Inc., 1997, p. 591–634.

Kent et al. *Security Architecture for the Internet Protocol.* Nov. 1998, pp. 1–66.

Hifn 6500 Public Key Processor. http://www.hifn.com/products/6500html, printed Apr. 29, 2001.

FastMap Integrated Circuit. Rainbow Technologies Internet Security Group. Oct. 1, 1998.

Preuss, Lisa. "Rainbow Technologies Announces OEM Availability of FastMap High Performance Public Key Integrated Circuit Processor," News Release. Atlanta, GA, Oct. 21, 1998.

SafeNet: OEM Solutions. www.safenet-inc.com/technology/chips/Chip2141.asp, printed Apr. 29, 2001.

Suchmann, David. *Electronic Products: Novel Approach to Chip Design Improves SSL Encryption.* Sep. 3, 2001.

*NetOctave Announces SSL and IPSec Security Accelerator Boards.* News Release, Sep. 11, 2001.

*Next–generation Applications Need IPSec Security: NetOctave IPSec Solutions.* Brochure, Mar., 2001.

*Next–generation Applications Need SSL Security: NetOctave SSL Solutions.* Brochure, Mar., 2001.

International Search Report, PCT/US01/14616, Feb. 27, 2002.

International Search Report, PCT/US01/14561, Feb. 27, 2002.

Tiountchik, *Systolic Modular Exponentiation Via Montgomery Algorithm*, Electronics Letters, vol. 34, No. 9, Apr. 30, 1998, pp. 874–875.

Koc et al., *Analyzing and Comparing Montgomery Multiplication Algorithms, IEEE Micro*, vol. 16, No. 1, Jun. 1, 1996, pp. 26–33.

Eldridge et al., *Hardware Implementation of Montgomery's Modular Multiplication Algorithm*, IEEE Transactions on Computers, vol. 42, No. 6, Jun. 1993, pp. 693–699.

Sauerbrey, *A Modular Exponentiation Unit Based on Systolic Arrays*, Advances in Cryptology–Auscrypt. Gold Coast, Queensland, Dec. 13–16, 1992, Proceedings of the Workshop on the Theory and Application of Cryptographic Techniques, vol. Conf. 3, Dec. 13, 1992, pp. 505–516.

* cited by examiner

FIG. 17

| Exponent Bit | 0 | 1 | 1 | 0 | 1 | 0 | 0 | 1 MSB |
|---|---|---|---|---|---|---|---|---|
| A Register | | $g^2$ mod m | $g^2g^4$ mod m $=g^6$ mod m | $g^6$ mod m | $g^6g^{16}$ mod m $=g^{22}$ mod m | $g^{22}$ mod m | $g^{22}$ mod m | $g^{22}g^{128}$ mod m $=g^{150}$ mod m |
| B Register | $gR$ mod m | $g^2R$ mod m | $g^4R$ mod m | $g^8R$ mod m | $g^{16}R$ mod m | $g^{32}R$ mod m | $g^{64}R$ mod m | $g^{128}R$ mod m | $g^{256}R$ mod m |
| Time | 0 | 1 | 2 | 3 | 4 | 5 | 6 | 7 | 8 |

LSB appears at leftmost exponent bit; MSB at rightmost.

ACCELERATED MONTGOMERY EXPONENTIATION USING PLURAL MULTIPLIERS

CROSS REFERENCE TO RELATED APPLICATION

This application claims the benefit of provisional application Ser. No. 60/203,409, filed May 11, 2000, entitled Cryptographic Acceleration Methods and Apparatus, the disclosure of which is hereby incorporated herein in its entirety as if set forth fully herein.

FIELD OF THE INVENTION

This invention relates to exponentiation circuits and methods, and more particularly to Montgomery exponentiation circuits and methods.

BACKGROUND OF THE INVENTION

Montgomery multiplication is widely used to perform modular multiplication. Modular multiplication is widely used in encryption/decryption, authentication, key distribution and many other applications. Montgomery multiplication also may be used for the basis for Montgomery exponentiation, which also is widely used in the above-described and other applications.

Montgomery multiplication and exponentiation are described in U.S. Pat. No. 6,185,596 to Hadad et al. entitled Apparatus & Method for Modular Multiplication & Exponentiation Based on Montgomery Multiplication; U.S. Pat. No. 6,061,706 to Gai et al. entitled Systolic Linear-Array Modular Multiplier with Pipeline Processing Elements; U.S. Pat. No. 6,085,210 to Buer entitled High-Speed Modular Exponentiator and Multiplier; U.S. Pat. No. 5,513,133 to Cressel et al. entitled Compact Microelectronic Device for Performing Modular Multiplication and Exponentiation Over Large Numbers; and European Patent Application 0 656 709 A2 to Yamamoto et al. entitled Encryption Device and Apparatus for Encryption/Decryption Based on the Montgomery Method Using Efficient Modular Multiplication. Montgomery multiplication and exponentiation also are described in publications by Gutub et al. entitled An Expandable Montgomery Modular Multiplication Processor, Eleventh International Conference on Microelectronics, Nov. 22–24, 1999, pp. 173–176; Tenca et al. entitled A Scalable Architecture for Montgomery Multiplication, First International Workshop, Cryptographic Hardware and Embedded Systems, Lecture Notes on Computer Science, Vol. 1717, 1999, pp. 94–108; and Freking et al. entitled Montgomery Modular Multiplication and Exponentiation in the Residue Number System, Conference Record of the Thirty-Third Asilomar Conference Signals, Systems, and Computers, Vol. 2, 1999, pp. 1312–1316. The disclosure of all of these references is hereby incorporated herein in their entirety as if set forth fully herein.

Montgomery exponentiation often is used with large numbers. Accordingly, it may be desirable to accelerate Montgomery exponentiation so that rapid encryption/decryption, authentication, key management and/or other applications may be provided.

SUMMARY OF THE INVENTION

Embodiments of the invention provide Montgomery exponentiators and methods that modulo exponentiate a generator (g) to a power of an exponent (e). Embodiments of Montgomery exponentiators and methods include a first multiplier that is configured to repeatedly square a residue of the generator, to produce a series of first multiplier output values at a first multiplier output. A second multiplier is configured to multiply selected ones of the series of first multiplier output values that correspond to a bit of the exponent that is a predetermined binary value, such as binary one, by a partial result, to produce a series of second multiplier output values at a second multiplier output. By providing two multipliers that are serially coupled as described above, Montgomery exponentiation can be accelerated.

Montgomery exponentiators and methods according to other embodiments of the invention include a first register that is coupled to the second multiplier output, and is configured to serially store the series of second multiplier output values, to thereby provide the partial result. A second register is coupled to the first multiplier output, and is configured to serially store the series of first multiplier output values, and to serially provide the series of first multiplier values to the first and second multipliers. In yet other embodiments, the first register is configured to be initialized to the first binary value, and the second register is further configured to be initialized to the residue of the generator.

Montgomery exponentiators and methods according to other embodiments of the present invention include a first multiplier that is configured to be responsive to a residue of the generator and that includes a first multiplier output. A second multiplier is configured to be responsive to the first multiplier output, and includes a second multiplier output. In other embodiments, a first register is coupled to the second multiplier output, and the second multiplier output is also responsive to the first register. A second register is coupled to the first multiplier output, and the first multiplier is further responsive to the second register. The second multiplier is responsive to the first multiplier output via the second register. In still other embodiments, a controller also is provided that is configured to cause the first multiplier to square contents of the second register, and to cause the second multiplier to multiply the contents of the second register by contents of the first register if a selected bit of the exponent is a predetermined binary value, such as binary one, and to refrain from multiplying the contents of the second register by the contents of the first register if the selected bit of the exponent is not the predetermined binary value.

In any of the above-described embodiments, conventional Montgomery multipliers may be used for the first and second multipliers. However, according to other embodiments of the invention, embodiments of Montgomery multipliers may be used that can provide accelerated Montgomery multiplication using plural multipliers. These embodiments of the invention use Montgomery multipliers and methods that modular multiply a residue multiplicand by a residue multiplier to obtain a residue product. Embodiments of Montgomery multipliers and methods include a scalar multiplier, a first vector multiplier and a second vector multiplier. A controller is configured to control the scalar multiplier, the first vector multiplier and the second vector multiplier, to overlap scalar multiplies using a selected digit of the multiplier and vector multiplies using a modulus and the multiplicand. It will be understood that as used herein, digit refers to a number place in any base number system, including decimal, hexidecimal and binary. The latency of Montgomery multiplication thereby can be reduced to nearly the latency of a single scalar multiplication.

The Montgomery multipliers and methods according to other embodiments of the invention include a scalar multiplier that is configured to multiply a least significant digit of the multiplicand by a first selected digit of the multiplier, to produce a scalar multiplier output. A first vector multiplier is configured to multiply the scalar multiplier output by a modulus, to produce a first vector multiplier output. A second vector multiplier is configured to multiply a second selected digit of the multiplier by the multiplicand, to produce a second vector multiplier output. An accumulator is configured to add the first vector multiplier output and the second vector multiplier output, to produce a product output. The first selected digit of the multiplier preferably is a next more significant digit of the multiplier, relative to the first selected digit of the multiplier.

In other embodiments of the invention, the scalar multiplier is further configured to multiply the least significant digit of the multiplicand by the first selected digit of the multiplier and by one over (i.e., divided by) a negative of a least significant digit of the modulus, to produce the scalar multiplier output. In yet other embodiments, a first multiplexer also may be provided that is configured to multiplex the least significant digit of the multiplicand and one over the negative of the least significant digit of the modulus into the scalar multiplier.

In still other embodiments of the invention, a first feedback path is configured to feed the scalar multiplier output back into the scalar multiplier. A second feedback path is configured to feed the product output into the scalar multiplier. A summer is configured to sum the scalar multiplier output and the product output from the respective first and second feedback paths and to provide the sum of the scalar multiplier output and the product output to the scalar multiplier. A second multiplexer also is provided that is configured to multiplex the first selected digit of the multiplier and the sum of the scalar multiplier output and the product output into the scalar multiplier. A first register is coupled between the scalar multiplier output and the first vector multiplier and a second register is coupled between the product output and the second feedback path. Accordingly, latency in Montgomery multiplication can be reduced.

BRIEF DESCRIPTION OF THE DRAWINGS

FIG. 17 is a timing diagram that illustrates timing of operations for performing Montgomery exponentiation according to embodiments of the present invention.

DETAILED DESCRIPTION OF PREFERRED EMBODIMENTS

Figure 1:
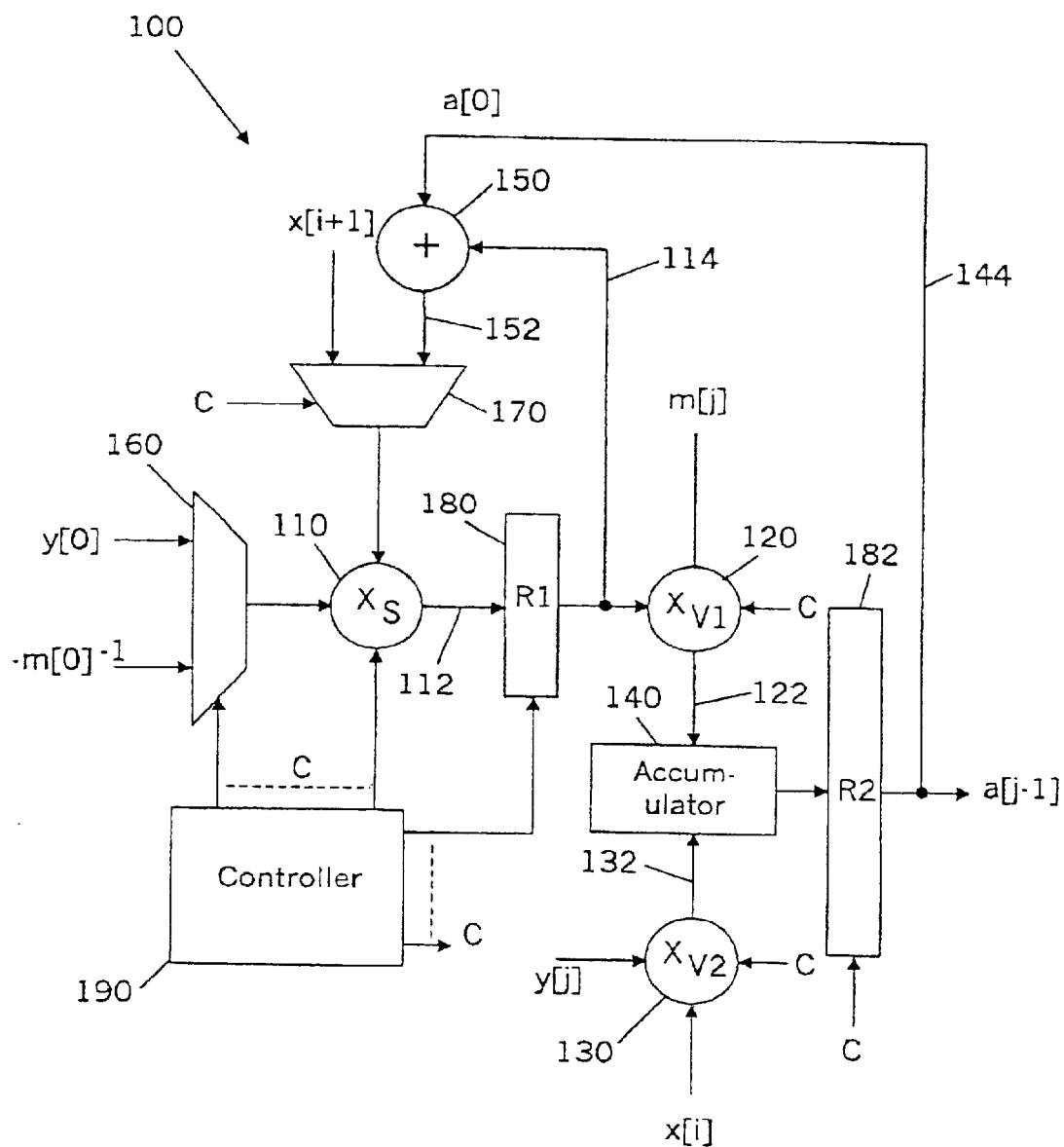
FIG. 1 is a block diagram of Montgomery multipliers and methods according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present Detailed Description will first begin with a description of Montgomery multipliers and methods that can be used to perform Montgomery exponentiation and methods, according to embodiments of the invention. It will be understood, however, that conventional Montgomery multipliers and methods also may be used. The present Detailed Description then will describe Montgomery exponentiators and methods according to embodiments of the present invention. Finally, an example will provide detailed structural and functional descriptions of a Public Key Engine (PKE) that includes accelerated Montgomery exponentiation and multiplication according to embodiments of the invention.

Montgomery Multiplication

The Montgomery multiplication algorithm described below is Algorithm 14.36 in Menezes et al., *Handbook of Applied Cryptography*, CRC Press, Inc., 1997, p. 602, the disclosure of which is hereby incorporated herein in its entirety as if set forth fully herein. In embodiments of the invention, the algorithm operates on digits of the numbers.

Each number is divided into n digits of WORD_SIZE length. The inputs are a modulus m, a multiplier x, and a multiplicand y, each of which is an R residue modulo m, $R=2^{n*WORD\_SIZE}$, and $m'=-m[0]^{-1} \mod 2^{WORD\_SIZE}$. The algorithm is:

```
a=0
for i from 0 to n-1 do {
    u[i]=((a[0]+x[i]*y[0])*m¹)mod 2^WORD_SIZE;
    a=(a+x[i]*y+u[i]*m)/2^WORD_SIZE,
}
if a≧m{
    a=a-m;
}
return (a);
```

Embodiments of the present invention can simultaneously use three multipliers to accelerate Montgomery multiplication. Embodiments of the present invention may stem from recognitions that the calculation of u[i] in the Montgomery algorithm, i.e., $u[i]=((a[0]+x[i]*y[0])*m') \mod 2^{WORD\_SIZE}$, involves two scalar multiplies, whereas the calculation of a in the Montgomery algorithm, i.e., $a=(a+x[i]*y+u[i]*m)/2^{WORD\_SIZE}$, involves two vector multiplies. Moreover, the results of the scalar multiplication are used in order to perform one of the vector multiplications. Embodiments of the invention can allow the vector multiplication at the end of each loop iteration to overlap with the scalar multiplications at the beginning of the next loop iteration. Accordingly, embodiments of the invention can exploit parallelism of the Montgomery multiplication algorithm, and can execute the scalar multiplication with reduced, and preferably minimum, latency, and increased, and preferably maximum, possible throughput, which may be limited mainly by the multipliers.

Referring now to FIG. 1, Montgomery multipliers and methods according to embodiments of the invention are illustrated. These embodiments preferably are embodied in one or more integrated circuit chips. As shown in FIG. 1, embodiments of Montgomery multipliers and methods 100 include a scalar multiplier 110, denoted in FIG. 1 by $x_s$, that is configured to multiply a least significant digit y[0] of the multiplicand y by a first selected digit x[0] of the multiplier x, to produce a scalar multiplier output 112. A first vector multiplier 120, denoted in FIG. 1 by $x_{v1}$, is configured to multiply the scalar multiplier output 112 by a modulus m[j], to produce a first vector multiplier output 122. A second vector multiplier 130, denoted in FIG. 1 by $x_{v2}$, is configured to multiply a second selected digit x[i] of the multiplier x by the multiplicand y[j], to produce a second vector multiplier output 132. The second selected digit preferably is a next more significant digit of the multiplier x, relative to the first selected digit. An accumulator 140, is configured to add the first vector multiplier output 122 and the second vector multiplier output 132, to produce a product output, denoted in FIG. 1 by [j−1].

Still referring to FIG. 1, in other embodiments, the scalar multiplier 110 is further configured to multiply the least significant digit y[0] of the multiplicand y, by the first selected digit x[0] of the multiplier x, and by 1 over a negative of a first digit of the modulus mod $2^{WORD\_SIZE}$, denoted in FIG. 1 as $-m[0]^{-1}$, to produce the scalar multiplier output 112. More particularly, a first multiplexer 160 is configured to multiplex the least significant digit y[0] of the multiplicand y, and 1 over a negative of a first digit of the modulus, $-m[0]^{-1}$, into the scalar multiplier 110.

Still referring to FIG. 1, in other embodiments, a first feedback path 114 is configured to feed the scalar multiplier output 112 back into the scalar multiplier 110. A second feedback path 144 is configured to feed the product output a[0] back into the scalar multiplier 110. The first and second feedback paths 114 and 144, respectively, are configured to be applied to a summer 150, such that the summer 150 is configured to sum the scalar multiplier output 112 and the product output a[0] from the respective first and second feedback paths 114 and 144, and to provide the sum 152 of the scalar multiplier output 112 and the product output a[0] to the scalar multiplier 110.

Still referring to FIG. 1, in yet other embodiments, a second multiplexer 170 may be provided that is configured to multiplex the first selected digit x[i−1] of the multiplier x, and the sum 152 of the scalar multiplier output 112 and the product output a[j−1], into the scalar multiplier 110. In other embodiments, a first register 180, denoted by R1 in FIG. 1, is coupled between the scalar multiplier output 112 and the first vector multiplier 120. A second register 182, denoted by R2 in FIG. 1, is coupled between the accumulator 140 and the second feedback path 144. Finally, in still other embodiments, a controller 190 is provided that outputs a plurality of control signals C that are configured to control the first multiplexer 160, the second multiplexer 170, the scalar multiplier 110, the first and second vector multipliers 120 and 130, and/or the first and second registers 180 and 182, as shown in FIG. 1. It will be understood that the controller also may be used to control the accumulator 140 and the summer 150, and also may be used to control the inputs to the multiplexers 160 and/or 170 and/or the multipliers 110, 120 and/or 130. It also will be understood that the input signals, such as the multiplier x and the multiplicand y also may be provided to the controller 190 and distributed by the controller in a manner shown in FIG. 1.

In general, the controller 190 is configured to control the scalar multiplier 110, by the first vector multiplier 120, and the second vector multiplier 130, to overlap scalar multiplies using a selected digit of the multiplier, and vector multiplies using a modulus and the multiplicand, to thereby allow latency of Montgomery multiplication to be reduced to the latency of a single scalar multiplication. It will be understood by those having skill in the art that the controller 190 may be embodied as special purpose computer(s), general purpose computer(s) running a stored program(s), logic gates, application-specific integrated circuit(s), programmable logic controller(s), state machine(s), combinations thereof and/or other controller configurations well known to those having skill in the art.

Figure 2:
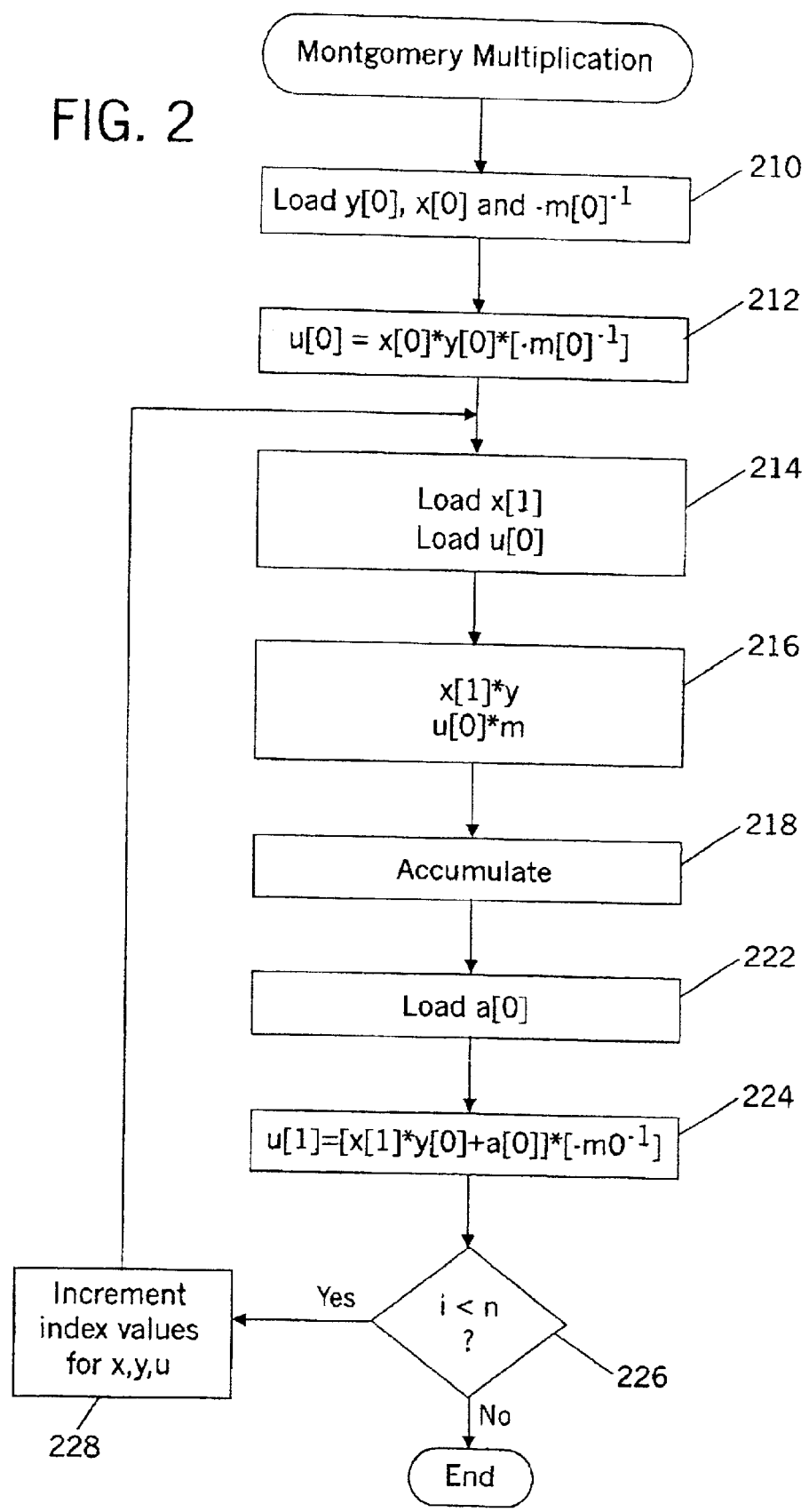
FIG. 2 is a flowchart illustrating operations for performing Montgomery multiplication according to embodiments of the present invention.
Figure 3:
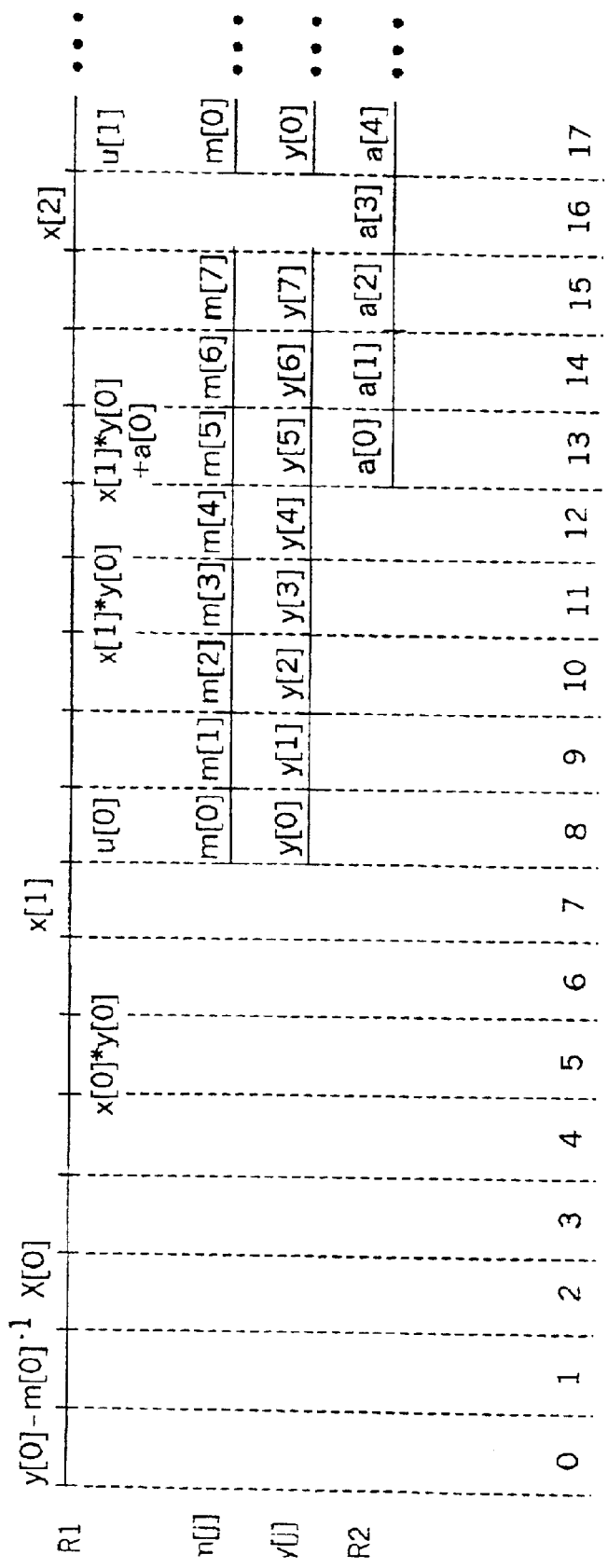
FIG. 3 is a timing diagram that illustrates timing of operations for performing Montgomery multiplication according to embodiments of the present invention.

FIG. 2 is a flowchart that illustrates operations for performing Montgomery multiplication according to embodiments of the present invention. These operations may be performed by the controller 190 of FIG. 1. FIG. 3 is a timing diagram illustrating timing of operations over a series of cycles, according to embodiments of the invention.

Referring now to FIGS. 1, 2 and 3, the least significant digit y[0] of the multiplicand y, the least significant digit x[0]of the multiplier x, and $-m[0]^{-1}$, are loaded, for example, into the multiplexers 160 and 170 of FIG. 1, as shown at Block 210. The loading may be accomplished during time intervals 0, 1 and 2 of FIG. 3. It will be understood that the loading sequence may be changed, and intervals 3 and 4, during which no loading occurs, may be reduced or eliminated.

Then, referring to Block 212, a first scalar multiplier output 112, designated u[0], is computed by multiplying x[0]*y[0] using the first and second multiplexers 160 and 170, and the scalar multiplier 110. In FIG. 3, this multiplication is shown as occurring in time slot 5, with the results m[0] being produced in time slot 8. The first scalar multiplier output u[0] may be stored in the first register 180. At this point, there is no previous partial result, so u[0]=u[0]*(−m[0]$^{-1}$). This is a second scalar multiply, as shown in Block 212.

Then, referring to Block 214, the next most significant digit of the multiplier x[1] is loaded into the scalar multiplier 110, and x[0] is pipelined into the vector multiplier 120 via register 180, as shown at time slots 7 and 8 of FIG. 3. The vector multipliers 120 and 130, begin to multiply the modulus m by u[0], and also to multiply x[1] by y, as shown at Block 216 of FIG. 2 and at time slots 8–15 of FIG. 3. The results are accumulated at Block 218, and stored in the second register 182.

When the vector multipliers 120 and 130 and the accumulator 140 produce the first digit of the product a[0], at time slot 13 of FIG. 3, it is loaded, via the second feedback path 144, into the scalar multiplier 110 using the summer 150 and the second multiplexer 170, as shown at Block 222 of FIG. 2. The scalar multiplier 110 then begins to multiply x[1] by y[0] and add a[0] using the multiplexer 160, the multiplexer 170 and the summer 150, as shown at time slot 13. The result u[1] is produced at the output 112 of the scalar multiplier 110 in time slot 17 of FIG. 3 and at Block 224 of FIG. 2. Again, there is a second scalar multiply.

At Block 224, each digit of the multiplicand y is multiplied by the multiplier u and added to the previous partial result, producing a partial result having n+1 digits. The most significant n digits may be stored, for example, as n+1 digits plus an overflow bit, where the overflow bit may be stored in a register in the datapath. The least significant digit of each partial result is fed back to the scalar multiplier 110 for the next result via the second feedback path 144, so that this need not add any delay or latency to the result. Only the least significant digit may need an extra multiplier latency to fill the pipeline, as was shown in time slots 0–5 of FIG. 3. At the end of the multiplication of Block 224, m may be subtracted from the result. This subtraction also may be folded into the last loop of iteration. If the result is negative, m may be added back. Otherwise, operations may continue. The result may be copied to a register.

Then, referring to Block 226, as long as i is less than n, the index values for x, y and u are incremented by 1 at Block 228, and operations again proceed to Block 214, as shown in time slots 16 and 17 of FIG. 3. Thus, in one clock cycle after the end of a loop, x[i+2] for the next loop is loaded into the scalar multiplier 110, and simultaneously x[i+1] and u[i+1] are loaded into the vector multipliers 120 and 130. Since all of the multipliers may have the same latency, as long as twice the latency through the scalar multiplier 110 is less than or equal to the number of digits in the multiplicand y, the latency of the scalar multiplier 110 may only appear before the first vector multiply (time slots 0–5 of FIG. 3) and may be hidden thereafter. If not, then the performance may only square linearly, rather than as the square, for "small" numbers.

The total execution time for performing Montgomery multiplication according to embodiments of the invention that are illustrated in FIGS. 1–3 may be calculated as follows:

16+
3*(5+CEILING(len[m]/64)−1))+
1.5*len[exponent]*
  {12+(CEILING(len[m]/64)*(CEILING((len[m])/64+
  1)+(5+CEILING(len[m]/64)−1)};

where len denotes length. Accordingly, the latency of a single Montgomery multiplication can be reduced to nearly the latency of a single scalar multiplication.

The scalar multiplier 110 performs two successive scalar multiplies for each digit of the multiplier. This latency may remain, because the first output u[0], of the scalar multiplier 110, is generated before the two vector multipliers 120 and 130 can start iterating over the multiplicand digits (y[j]) and the multiplier digits (x[i]). After u[0], the scalar multiplier 110 starts the calculations for the second multiplier digit in parallel with the completion of the vector multiplications for the first multiplier digit. For numbers with as many digits as the depth of the scalar multiplier 110, there need be no additional latency. For smaller numbers, there may be some added latency because of the scalar multiplier pipeline, but this additional latency still can be less than without the overlapped multiplications.

Montgomery Exponentiation

The algorithm as described below is Algorithm 14.94 in Menezes et al., *Handbook of Applied Cryptography*, CRC Press, Inc., 1997, p.620, the disclosure of which is hereby incorporated herein by reference in its entirety as if set forth fully herein.

INPUT: $m=(m_{l-1} \ldots m_0)_b$, $R=b^l$, $m'=-m^{-1}$ mod b, $e=(e_t \ldots e_0)_2$ with $e_t=1$, and an integer x, $1 \leq x < m$.
OUTPUT: $x^e$ mod m.
  1. $\tilde{x} \leftarrow \text{Mont}(x, R^2 \text{ mod m})$, $A \leftarrow R$ mod m. ($R$ mod m and $R^2$ mod m may be provided as inputs.)
  2. For i from t down to 0 do the following:
    2.1 $A \leftarrow \text{Mont}(A, A)$.
    2.2 If $e_i=1$ then $A \leftarrow \text{Mont}(A, \tilde{x})$.
  3. $A \leftarrow \text{Mont}(A, 1)$.
  4. Return(A).

The algorithm described above can use a single Montgomery multiplier efficiently. For zero exponent bits, it skips ahead to the next lower exponent bit. The number of multiplies may be |exponent|+HammingWeight(exponent), where |exponent| is the number of significant bits in the exponent. Thus, the number of multiplies generally is 1.5 times the number of bits in the exponent, not including any zeroes above the most-significant non-zero bit, assuming the Hamming weight of the exponent is 0.5, which is a reasonable assumption for large random numbers that generally are used in cryptographic algorithms.

Embodiments of the invention may stem from recognition that if a user is willing to accept some inefficiency, the throughput of the exponentiation can be improved, for example by 50%, by duplicating the Montgomery multiplication datapath and reversing the order of the exponentiation. Thus, according to embodiments of the invention, first and second Montgomery multipliers are provided. The first Montgomery multiplier is loaded (initialized) with gR mod m, and performs |exponent|−1 squaring operations. The output of each squaring operation is loaded into the second Montgomery multiplier. The second multiplier is preloaded (initialized) with 1, which is the partial result, and gR mod m, which is the first multiplier output. If the least-significant bit of the exponent is binary one, the second multiplier multiplies gR mod m by one and writes the new partial result. If not, the second multiplier is idle for the first bit and would refrain from performing the multiply.

At the end of the first multiplication, the first multiplier loads its output ($g^2R$ mod m), into the multiplier register of the second multiplier. These operations repeat for each bit of the exponent. There can be |exponent| multiplication cycles, rather than |exponent|+HammingWeight(exponent) multiplication cycles.

It will be understood that an inefficiency may arise from the fact that the second multiplier does not perform a multiply when the exponent bit is zero. However, the latency of an individual operation can be reduced, for example by 33% on average, and there need be no duplication of a bit number cache or of control logic, including the host interface. Since the two multipliers are running in parallel with identical word lengths, the control logic may only be somewhat more complex, for example about 1.2–1.4 times as complex, on average.

Figure 15:
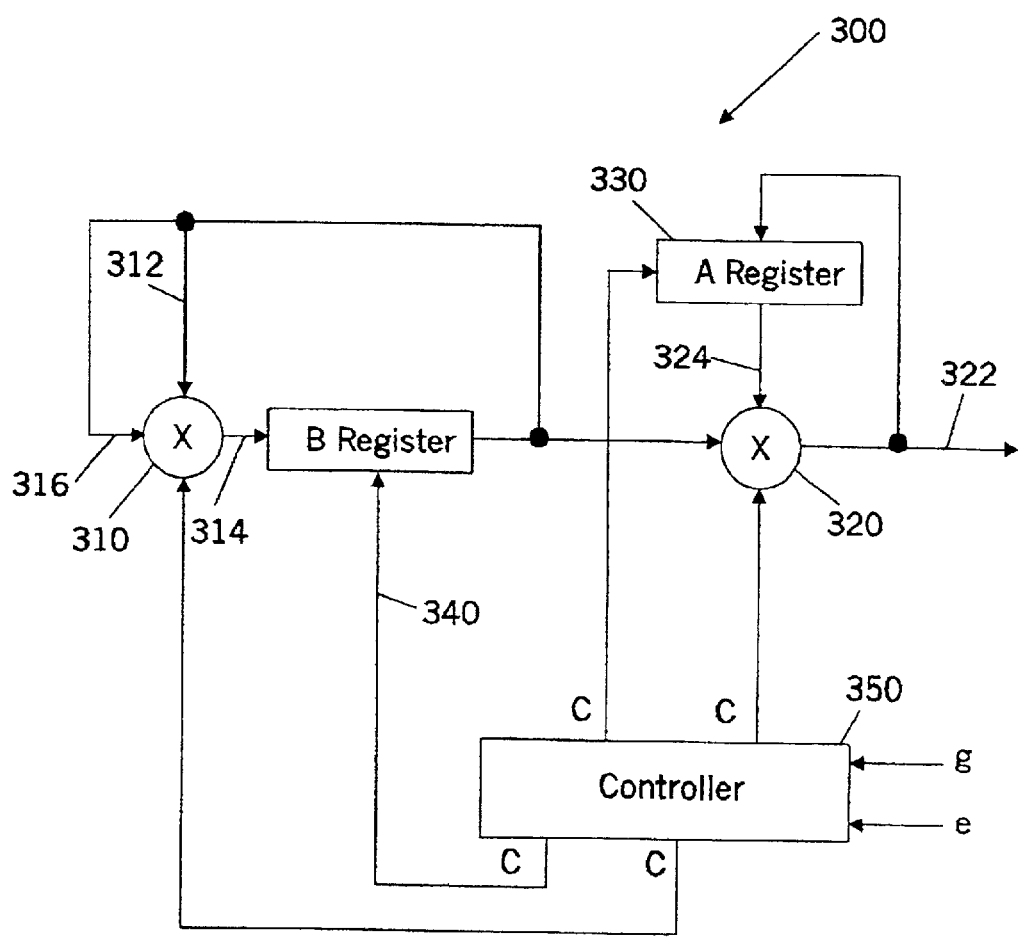
FIG. 15 is a block diagram of Montgomery exponentiators and methods according to embodiments of the present invention.

Referring now to FIG. 15, Montgomery exponentiators and methods according to embodiments of the invention are illustrated. These embodiments preferably are embodied in one or more integrated circuit chips. As shown in FIG. 15, embodiments of Montgomery exponentiators and methods 300 can be used to modulo exponentiate a generator (g) to a power of an exponent (e), to obtain a result, i.e, $r=g^e$ mod m. These embodiments of Montgomery exponentiators and methods 100 include a first multiplier 310 that is configured to repeatedly square a residue of the generator (gR mod m), to produce a series of first multiplier output values at a first multiplier output 314. Stated differently, the first multiplier 310 produces a series of first multiplier output values ($g^2R$ mod m), ($g^4R$ mod m), ($g^8R$ mod m), at the first multiplier output 314. A second multiplier 320 is configured to multiply selected ones of the series of first multiplier output values that correspond to a bit of the exponent that is a predetermined binary value, such as binary one, by a partial result 324, to produce a series of second multiplier output values at a second multiplier output 322. It will be understood that the first and second multipliers 310 and 320 can be conventional multipliers, such as conventional Montgomery multipliers. However, preferably, the first and second multipliers 310 and 320 each comprises embodiments of Montgomery multipliers that were described above in connection with FIGS. 1–3.

Still referring to FIG. 15, in other embodiments, a first register, also referred to as an A register, 330, is coupled to the second multiplier output 322. The first register 330 is configured to serially store the series of second multiplier output values from the second multiplier output 320, to thereby provide the partial result 324 to the second multiplier 320. A second register, also referred to as a B register, 340, is coupled to the first multiplier output 314, and is configured to serially store the series of first multiplier output values and to serially provide the series of first multiplier values to first and second inputs 312 and 316, respectively, of the first multiplier 310. In embodiments of the invention, the first register 330 is further configured to be initialized to the first binary value, preferably binary one. The second register 340 is further configured to be initialized to the residue of the generator, i.e. gR mod m.

Still referring to FIG. 15, in still other embodiments, a controller 350 is provided that outputs a plurality of control signals C, that are configured to control the first and second multipliers 310 and 320, and the first and second registers 330 and 340. It also will be understood that the input signals, such as the generator g and the exponent e also may be provided to the controller 350 in a manner shown in FIG. 15. Other input signals also may be provided. Finally, it will be understood by those having skill in the art that the controller 350 may be embodied as special purpose computer(s), general purpose computer(s) running a stored program(s), logic gates, application-specific integrated circuit(s), programmable logic controller(s), state machine(s), combinations thereof and/or other controller configurations well known to those having skill in the art.

In general, in embodiments of the invention, the controller 350 is configured to cause the first multiplier 310 to square the contents of the second register 340. The controller 350 also is configured to cause the second multiplier 320 to multiply the contents of the second register 340 by contents of the first register 330, if a corresponding bit of the exponent e is a predetermined binary value, such as binary one, and to refrain from multiplying the contents of the second register 340 by the contents of the first register 330, if the corresponding bit of the exponent is not the predetermined binary value.

Figure 16:
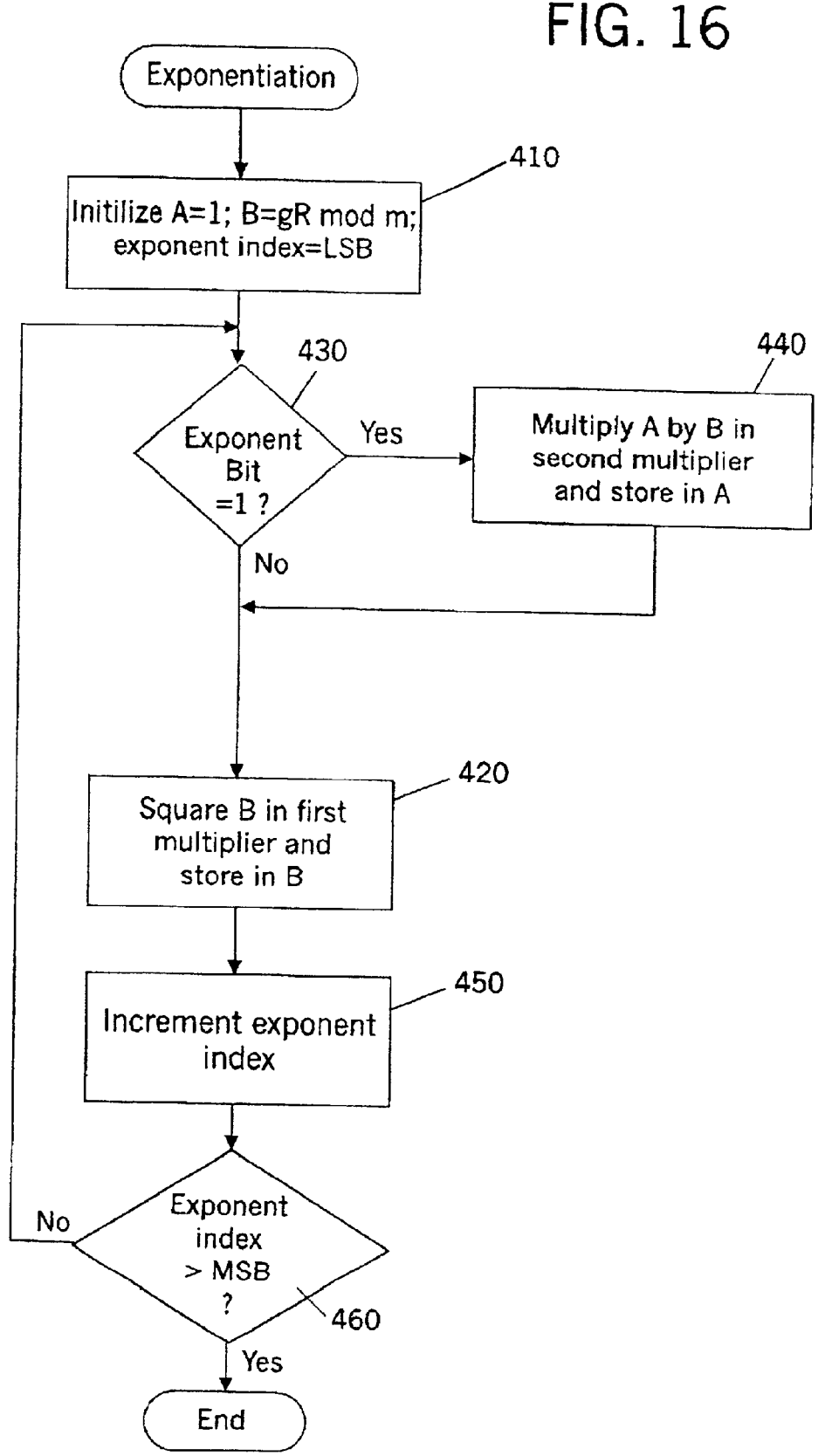
FIG. 16 is a flowchart illustrating operations for performing Montgomery exponentiation according to embodiments of the present invention.

FIG. 16 is a flowchart that illustrates operations for performing Montgomery exponentiation according to embodiments of the present invention. These operations may be performed by the controller 350 of FIG. 15. FIG. 17 is a timing diagram illustrating timing of operations over a series of time periods, according to embodiments of the invention. In FIG. 20, the example given is computing $r = g^{10010110}$ mod m, so that e=10010110 or 150 decimal.

Referring now to FIGS. 15, 16 and 17, initializing is performed at Block 410 by storing binary one in the A register 330 and storing gR mod m in the B register 340, as shown at time interval 0 of FIG. 17. An exponent index is initialized to the Least Significant Bit (LSB).

Then, in the next time interval 1 of FIG. 17, a test is made at Block 430 as to whether the exponent bit corresponding to the exponent index is 1. Since in time interval 1 the exponent bit is 0, the second multiplier 320 is not active. Rather, at Block 420, the contents of the B register 340 is squared and stored back in the B register 340 at Block 420. The exponent index is incremented by 1 at Block 450. Thus, at the end of the first time interval, binary 1 remains in the A register 330 and $g^2R$ mod m is stored in the B register 340.

At Block 460, a test is made as to whether the exponent index is less than the Most Significant Bit (MSB). Since at the end of time interval 1 the exponent index is less than the MSB, operations loop back to Block 430.

Referring again to Block 430, during time interval 2, the exponent bit is binary 1, so that at Block 420, the contents of the A register 330 is multiplied by the contents of the B register 340 in the second multiplier 320, and stored in the A register 330. Thus, at the end of time interval 2, the contents of the A register 330 is $g^2$ mod m. Then, at Block 420, the contents of the B register 340 is again squared in the first multiplier 310 and again stored in the B register 340, so that at the end of the second time interval the contents of the B register is $g^4R$ mod m. It also will be understood that the operations of Blocks 420 and 440 also may be performed in parallel during a time interval. The exponent index is again incremented at Block 450. Since at the end of the second time interval the exponent index is not greater than the most significant bit (Block 460), operations again loop back to Block 430.

As operations continue to proceed, the B register 340 will continue to accumulate intermediate exponentiation results, and the A register 330 will continue to accumulate intermediate results of Montgomery multiplication. When all of the bits of the exponent have been processed at Block 460, the output of the second multiplier 322 and/or the A register 330 will contain the result r.

Accordingly, embodiments of the invention as described in FIGS. 15–17, can first scan the exponent from most to least significant bit, to find the index of the most significant non-zero bit. If no non-zero bit is found, the exponent is zero, and the device returns 1 as the result. If a non-zero bit is found at index most_significant_bit, embodiments of the invention perform the exponentiation according to the following algorithm:

```
A= 1;
B = gR mod m;
most_significant_bit = 0
for i from (|exponent| - 1) down to 0 do {  // |exponent| is the number of
                                            //significant bits in the
                                            exponent
    if !found_exp_msb_flag {
        if exponent[i] {
            most_significant_bit = i;
            found_exp_msb_flag = 1;
        }
    }
    if (found_exp_msb_flag) {  //the exponent is non-zero,
                                therefore return A,
                                // which is 1
        for i from 0 up to most_significant_bit // in parallel
        // Montgomery multiplier A
        if exponent[i] {
            A = montgomery_multiplication(A, B);
            // multiply A times the generator
        }
        // Montgomery multiplier B
        B = montgomery_multiplication(B,B); // square B
    }
}
return (A).
```

The number of multiplies that is performed according to embodiments of FIGS. 15–17 generally is |exponent|. Thus, the number of multiplies generally is the number of bits in the exponent, not including any zeroes above the most-significant non-zero bit.

Embodiments of the present invention can use two Montgomery multipliers to speed up both RSA private key operations using the Chinese Remainder Theorem and also can use the two Montgomery multipliers to perform exponentiations modulo a prime number, where the Chinese Remainder Theorem does not apply. Embodiments of the present invention can perform RSA private key operations by performing each exponentiation modulo p and q in a separate multiplier, as described above. The algorithm for the RSA private key operation is described below:

p—Secret prime number, used during key generation. Also used for private key operations if using Chinese Remainder Theorem method. Size equals half the size of n. Note that p is less than q.

q—Secret prime number, used during key generation. Also used for private key operations if using Chinese Remainder Theorem method. Size equals half the size of n. Note that p is less than q.

d—Private key. d=e^−1 mod ((p−1)(q−1)). The size of d is limited by the maximum operand size for modular arithmetic operations.

dp—Precomputed for speed. dp=d mod ((p−1) mod p).

dq—Precomputed for speed. dq=d mod ((q—1) mod q).

n—Public key. The product of the two secret prime numbers, p and q. The size of d is limited by the maximum operand size for modular arithmetic operations.

pInv—Derived value used for Chinese Remainder Theorem method. pInv=p^−1 mod q cp—The additive inverse of the multiplicative inverse of the least-significant digit of p, mod $2^{128}$. This is an input to the exponentiation function.

cq—The additive inverse of the multiplicative inverse of the least-significant digit of q, mod $2^{128}$. This is an input to the exponentiation function.

A sequence of operations for RSA private key computation may reuse some of the operands to save storage space:

First Public Key engine. Each Montgomery multiplier actually may be part of a complete modular arithmetic unit:
o1=i mod p
o1=o1*R mod p (mod p)
dp=o1^A dp (mod p)

Second Public Key engine, in parallel with the first (also may duplicate storage):
o2=i mod q
o2=o2*R mod q (mod q)
dq=o2^dq(mod q)

First Public Key engine, after both engines finish the first set of parallel computations:
o=(dq−dp) mod q
o=(o*pInv) mod q
o=(o*p) mod n
o=(o+dp) mod n Since exponentiation followed by modulus are the most computationally intensive parts of the algorithm, this can reduce the execution time effectively in half.

Embodiments of the invention can perform other exponentiations by controlling the first multiplier 310 to constantly square the generator 312, while the second multiplier 320 multiplies the partial result 324 by the output of the first multiplier 314 for those powers of 2 corresponding to a 1 in the exponent expressed as a binary number. The number of multiplies that are performed can be the number of bits in the exponent, not including any zeroes above the most-significant non-zero bit, regardless of the Hamming weight of the exponent.

EXAMPLE

The following Example provides a detailed structural and functional description of a Public Key Engine (PKE) that includes accelerated Montgomery exponentiation and multiplication according to embodiments of the invention. This Example is illustrative and shall not be construed as limiting.

The Public Key Engine (PKE) calculates functions of large numbers modulo another large number. Moduli up to $2^{MAX\_LENGTH}-1$ are supported, where MAX_LENGTH=4,096 for the present Example. Large numbers are partitioned into digits of WORD_SIZE bits each, where WORD_SIZE=128 for the present Example. The length of large numbers are always given in number of digits. The PKE supports the following functions: Mod: r=a mod m; R Mod: r=R mod m, where R is defined as $2^{WORD\_SIZE*len[m]}$, and is internally generated by the PKE; Addition: r=a+b mod m; Subtraction: r=a−b mod m; Additive Inverse: r=−a mod m; Multiplication: r=a*b mod m; Multiplicative inverse: r=a^−1 mod m; and Exponentiation: r=g^e mod m. Exponentiation uses Montgomery's algorithm. Inputs are: a=g*R mod m, b=e, c=−m[0]^−1 mod $2^{WORD\_SIZE}$, and m. Note that m must be odd, else c does not exist.

Table 1 below lists restrictions on a, b, m and r for all functions.

TABLE 1

| | Restrictions on (a, b, m, r) for all functions |
|---|---|
| m | 1 ≤ len[m] ≤ 32 |
| | offset[m] + len[m] ≤ 256 |
| | $m_{MSD} \neq 0$ |
| a | 1 ≤ len[a] ≤ 32 |
| | offset[a] + len[a] ≤ 256 |
| b | 1 ≤ len[b] ≤ 32 |
| | offset[b] + len[b] ≤ 256 |
| r | offset[r] + len[m] ≤ 256; len[r]=len[m] |

Table 2 below gives additional restrictions on operands a and b for each function. Note that for functions in which operands a or b may contain fewer digits than m, these operands will be automatically left-padded with "0" digits by the hardware (but the padding digits will not actually be written to the Cache).

TABLE 2

| Function | Additional restriction(s) on a | Additional restriction(s) on b | Error flags that could be set (see Table 6) |
|---|---|---|---|
| Mod | none | n/a | 1, 2 |
| R Mod | n/a | n/a | 1, 2 |
| Addition | len(a) <= len(m) a < m | len(b) <= len(m) b < m | 1, 2, 3, 4 |
| Subtraction | len(a) <= len(m) a < m | len(b) <= len(m) b < m | 1, 2, 3, 4 |
| Additive Inverse | len(a) <= len(m) a < m | n/a | 1, 2, 3 |
| Multiplication | len(a) <= len(m) a < m | len(b) <= len(m) b < m | 1, 2, 3, 4 |

TABLE 2-continued

| Function | Additional restriction(s) on a | Additional restriction(s) on b | Error flags that could be set (see Table 6) |
|---|---|---|---|
| Multiplicative Inverse | len(a) <= len(m) a < m gcd(a, m) = 1 | n/a | 1, 2, 3, 6, 7 |
| Exponentiation | len(a) = len(m) a < m | none | 1, 2, 3 |

The PKE includes a 4Kbyte Big Number Cache. The Cache is organized as 256 words by WORD_SIZE bits. It is a load/store architecture, i.e., each arithmetic instruction only operates on the contents of the Big Number Cache. The PKE also includes working storage (tempA and tempB, which are not programmer visible) so that the result (r) can reuse the memory from one of its input operands.

Figure 4:
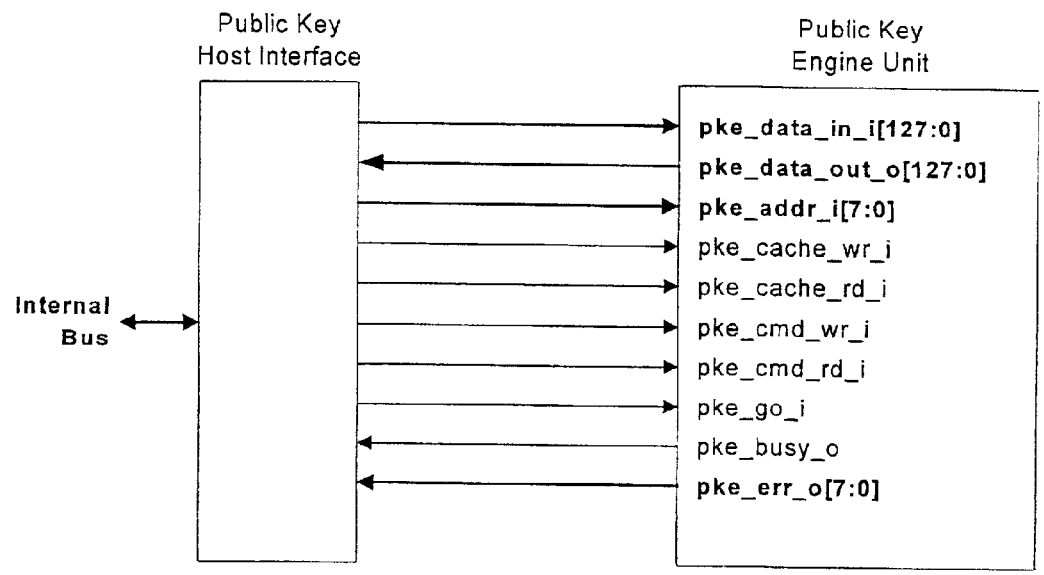
FIGS. 4–14 are diagrams of an example of embodiments of the present invention.

The PKE also includes a 32-byte command block, which is used to specify which function to execute. This block of eight 32-bit registers is loaded with the opcode and pointers to operands for a particular function. FIG. 4 is a block diagram that illustrates connection of the PKE to a public key host interface. The PKE I/O signatures are presented in Table 3 below. This table provides signal names, directions and brief descriptions.

TABLE 3

| Signal Name | Type | Description |
|---|---|---|
| clk | Input | Clock signal. |
| rst_n | Input | Active low asynchronous reset signal. |
| pke_data_in_i[WORD_SIZE-1:0] | Input | Input data bus. |
| pke_addr_i[7:0] | Input | Address bus. |
| pke_cache_wr_i | Input | Cache write. |
| pke_cache_rd_i | Input | Cache read. |
| pke_cmd_wr_i | Input | Command write. |
| pke_cmd_rd_i | Input | Command read. |

TABLE 3-continued

| Signal Name | Type | Description |
|---|---|---|
| pke_go_i | Input | Go signal. |
| pke_data_out_o[WORD_SIZE-1:0] | Output | Output data bus. |
| pke_busy_o | Output | Busy signal. |
| pke_err_o[7:0] | Output | Error flags. |

The five command signals are the pke_cache_rd/wr_i, pke_cmd_rd/wr_i, and pke_go_i pins. As a safety precaution against initiating erroneous commands, at most one of these pins can be active at any given time, otherwise no operation is initiated.

Reads or writes to the programmer-visible storage arrays (i.e. the Big Number Cache or the Command Block Registers) are accomplished by setting up a valid address (and data for a write) and pulsing one of the pke_cache/cmd_rd/wr_i signals. Both reads and writes are fully pipelined for burst operation. Read data on pke_data_out_o is held indefinitely until the next read command. The command registers are addressed by pke_addr_i[2:0], and the upper bits (i.e. pke_addr_i[7:3]) must be 0 for a command register access to occur. Table 4 below lists the read latencies.

TABLE 4

| Array | Read Latency assuming Host clock = PKE clock | Read Latency assuming Host clock = ½ PKE clock |
|---|---|---|
| Big Number Cache | 5 | 2 |
| Command Block Registers | 2 | 1 |

The Command Block Registers are loaded with a command opcode and parameter pointers and lengths. Note that since the PKE data bus is much wider than 32 bits, the PKE data bus is big-endian, the Command Block Registers are read or written on the upper 32 bits [127:96] of the PKE data bus. Table 5 below shows the format of the Command Block Registers.

TABLE 5

| Reg | Fields | | | |
|---|---|---|---|---|
| 0 | Opcode [31:28] | Reserved [27:0] | | |
| 1 | | Reserved [31:8] | | r offset [7:0] |
| 2 | Reserved [31:22] | m length [21:16] | Reserved [15:8] | m offset [7:0] |
| 3 | Reserved [31:22] | a length [21:16] | Reserved [15:8] | a offset [7:0] |
| 4 | Reserved [31:22] | b length [21:16] | Reserved [15:8] | b offset [7:0] |
| 5 | | Reserved [31:8] | | c offset [7:0] |
| 6 | | Reserved [31:0] | | |
| 7 | | Reserved [31:0] | | |

Once a command opcode and the associated parameter information have been loaded into the Command Block Registers, the pke_go_i signal can be asserted as early as the next clock cycle following a Command Block or Cache write. The PKE will respond by asserting the pke_busy_o signal until the command has completed, at which point the pke_busy_o signal will go low (provided pke_go_i has already returned low; otherwise pke_busy_o waits for pke_go_i to be de-asserted). A number of Error flags (pke_err_o) can be examined after the de-assertion of pke_busy_o to determine if the function was executed successfully. Table 6 lists the error codes.

TABLE 6

| Error Flag | Description |
| --- | --- |
| 0 | Illegal opcode. |
| 1 | Invalid 'r' parameter. |
| 2 | Invalid 'm' parameter. |
| 3 | Invalid 'a' parameter. |
| 4 | Invalid 'b' parameter. |
| 5 | Mult. inv. parameters are not relatively prime (i.e., gcd(a, m) ≠ 1). |
| 6 | Mult. Inv. watchdog timer expired (should never happen). |
| 7 | <Reserved - read as 0> |

Figure 5:
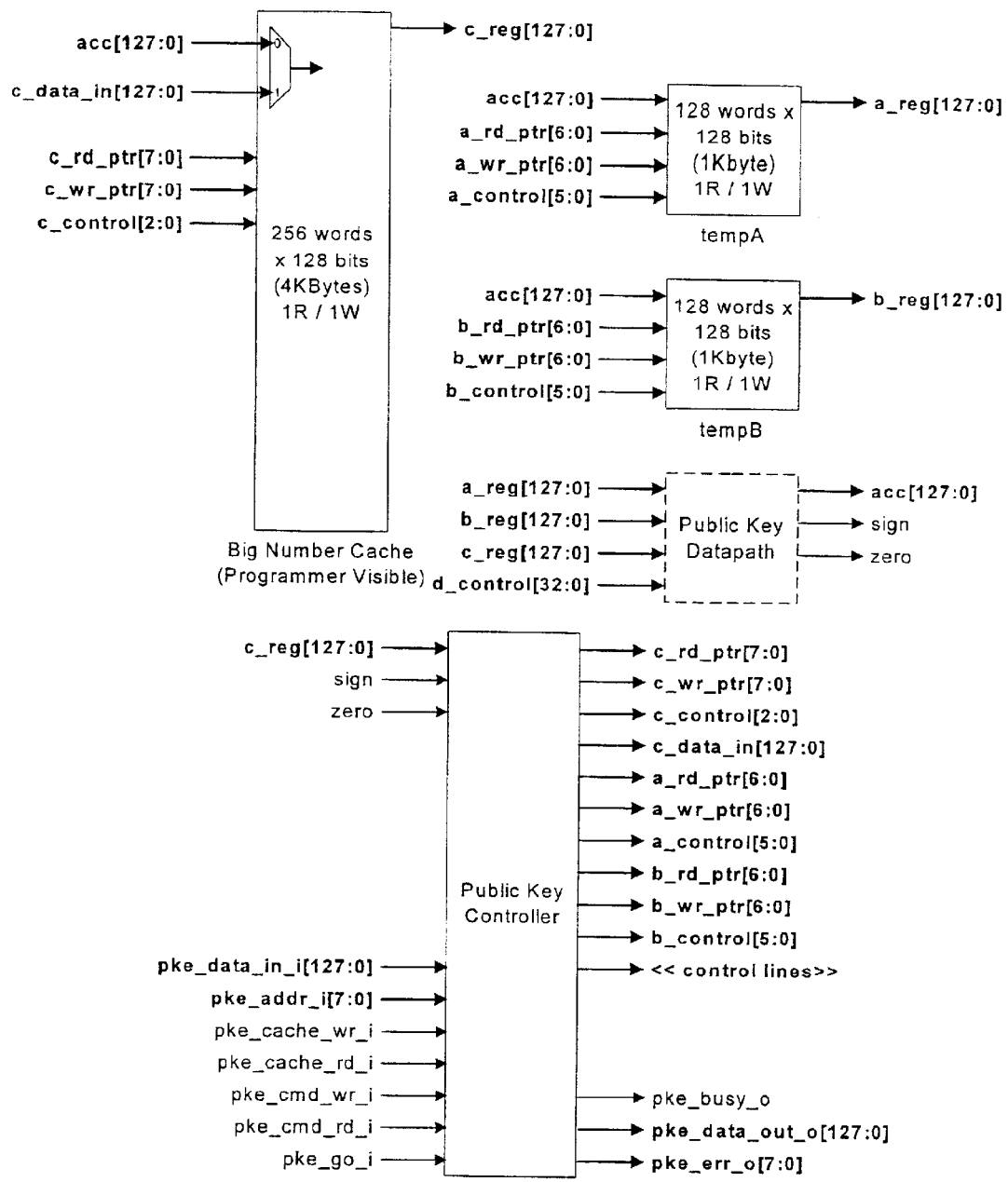

FIG. 5 is a top level block diagram of the PKE. As shown, there are four storage arrays in the PKE: a Big Number Cache, a Command Block, a tempA register and a tempB register.

The Big Number Cache (256 words by WORD_SIZE bits) is the only programmer visible memory in the PKE. The programmer accesses its contents by appending load and/or store command blocks to the command queue. Data is stored big-endian, meaning the more-significant words are at lower addresses.

The Command Block (8 words by 32 bits) resides in the Controller. It holds the opcode and parameters for one command. It is programmer visible.

The tempA (128 words by WORD_SIZE bits) register is the only working store used for all operations except exponentiation and multiplicative inverse. For multiplication, the result may need to be padded with an extra word before the modulo step. For exponentiation, tempA stores the intermediate result of a Montgomery multiplication, and tempB stores the intermediate exponentiation result, and g*R mod m. For multiplicative inverse, tempA stores u and D, and tempB stores v and B. Data is stored little-endian, meaning the more-significant words are at higher addresses. This array is not programmer visible.

The tempB (128 words by WORD_SIZE bits) register is a working store that is only used for exponentiation and multiplicative inverse. Data is stored little-endian, meaning the more-significant words are at higher addresses. This array is not programmer visible.

Table 7 shows the data sources for various registers in the datapath.

TABLE 7

| data sources | cache | creg | tempA | areg | tempB | breg |
| --- | --- | --- | --- | --- | --- | --- |
| m' | X | | | | | |
| m | X | | | | | |
| x | | X' | | | X† | |
| y | | X' | | | X† | |
| temp | | | | X | | |

TABLE 7-continued

| data sources | cache | creg | tempA | areg | tempB | breg |
| --- | --- | --- | --- | --- | --- | --- |
| acc_S | | | | X | | X |
| acc_C | | X | | X | | |

'multiplication
†exponentiation

Figure 12:
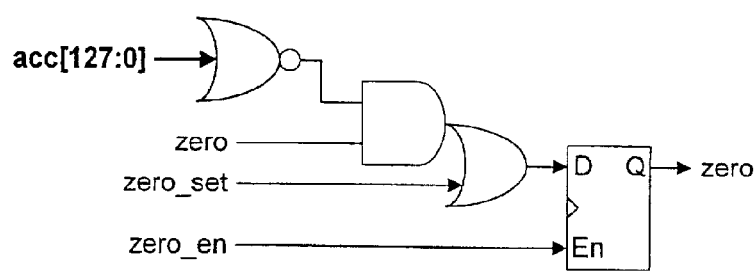
Figure 6:
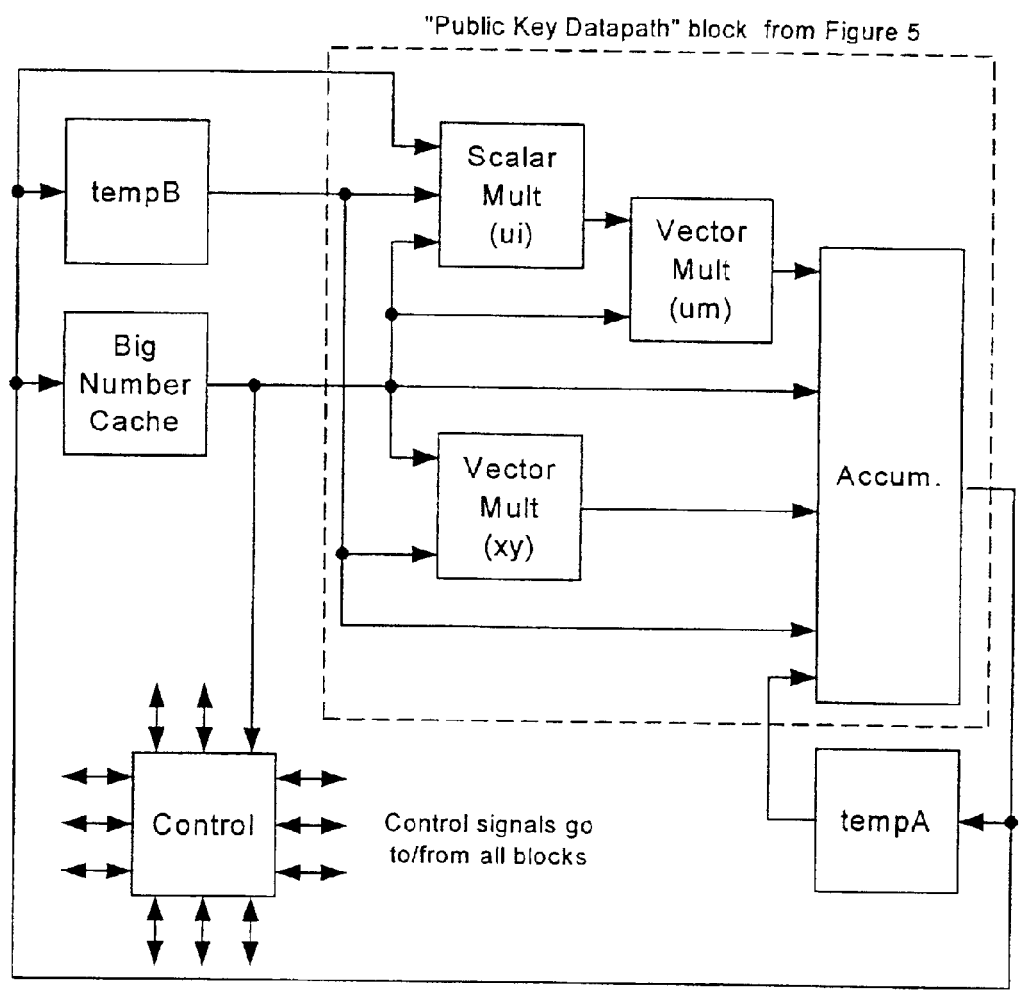
Figure 7:
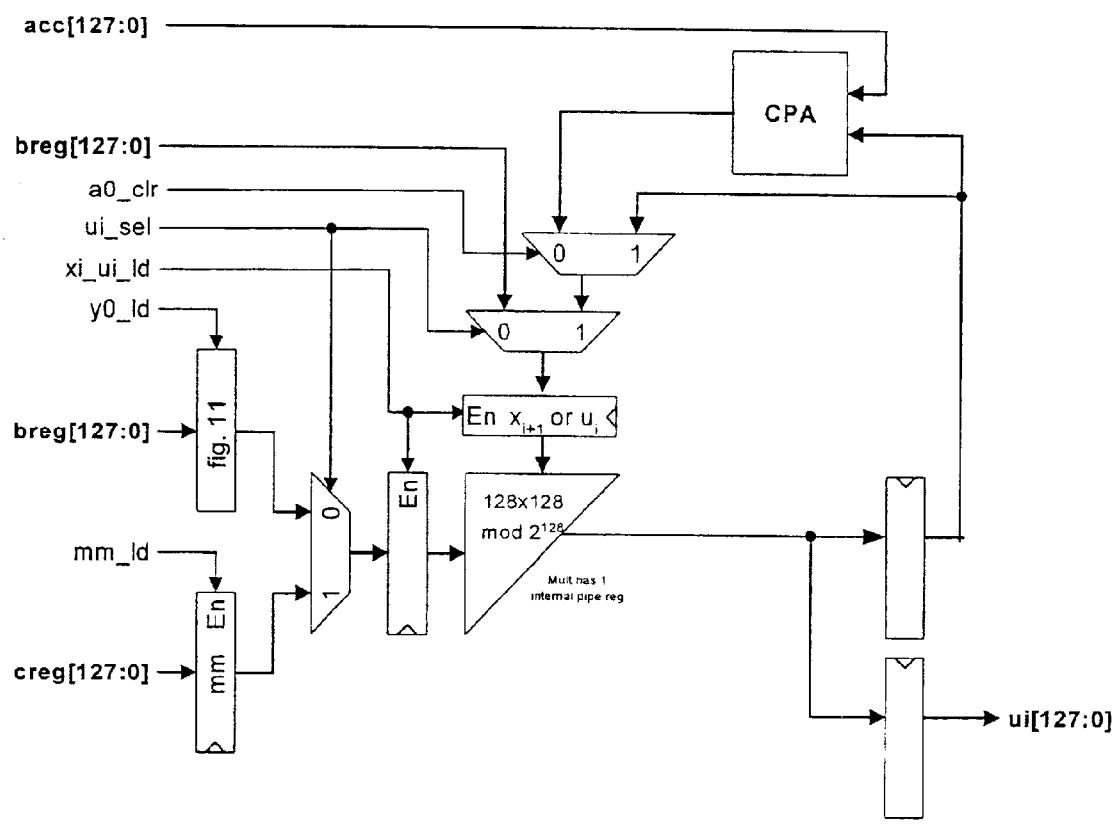
Figure 8:
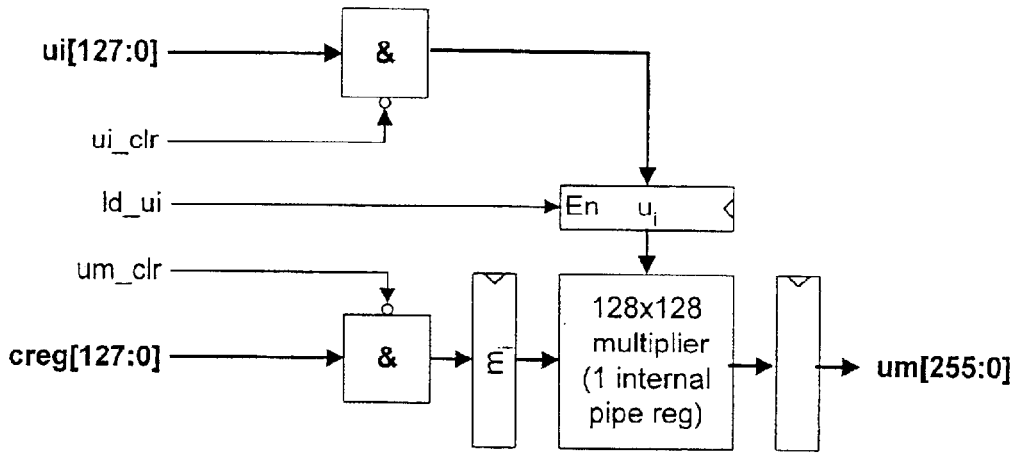
Figure 9:
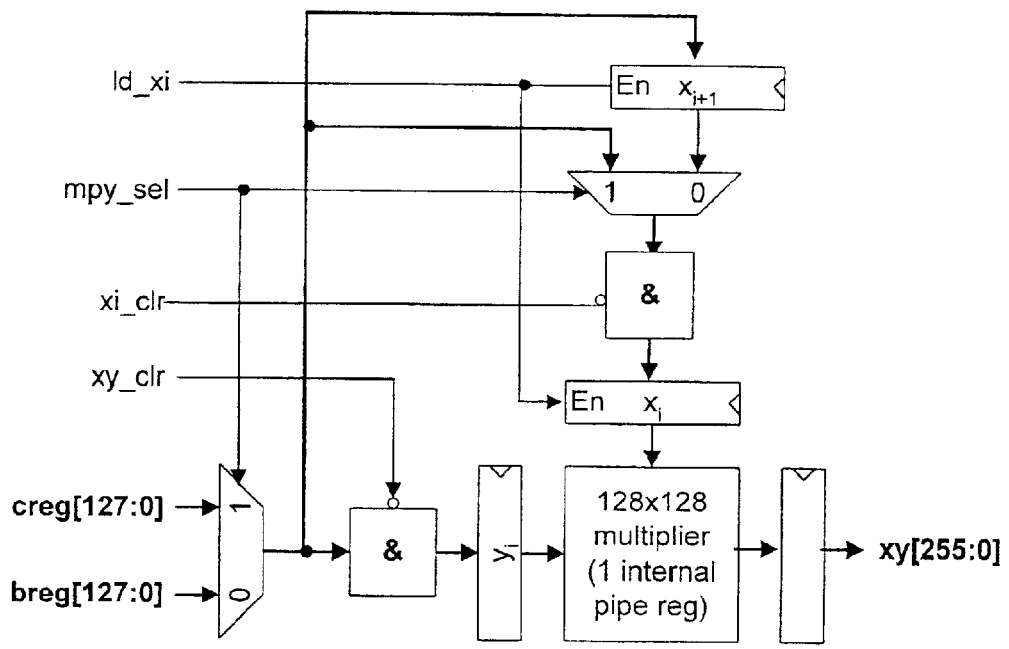
Figure 10:
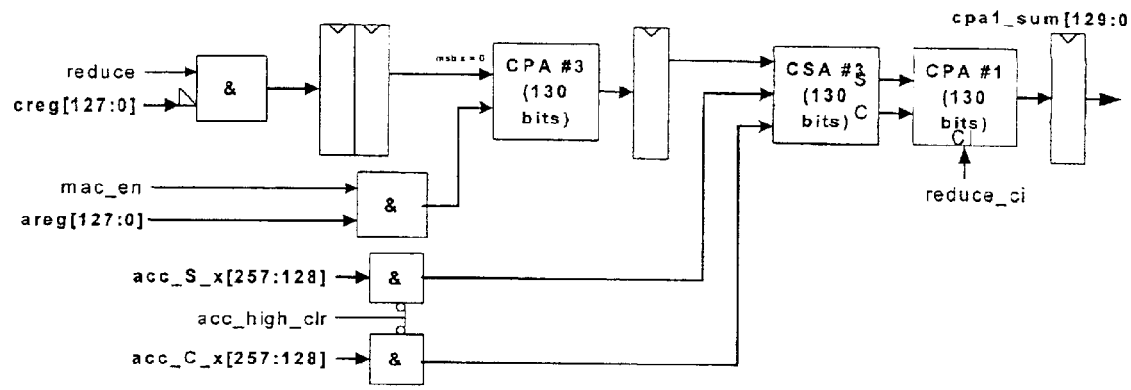
Figure 10:
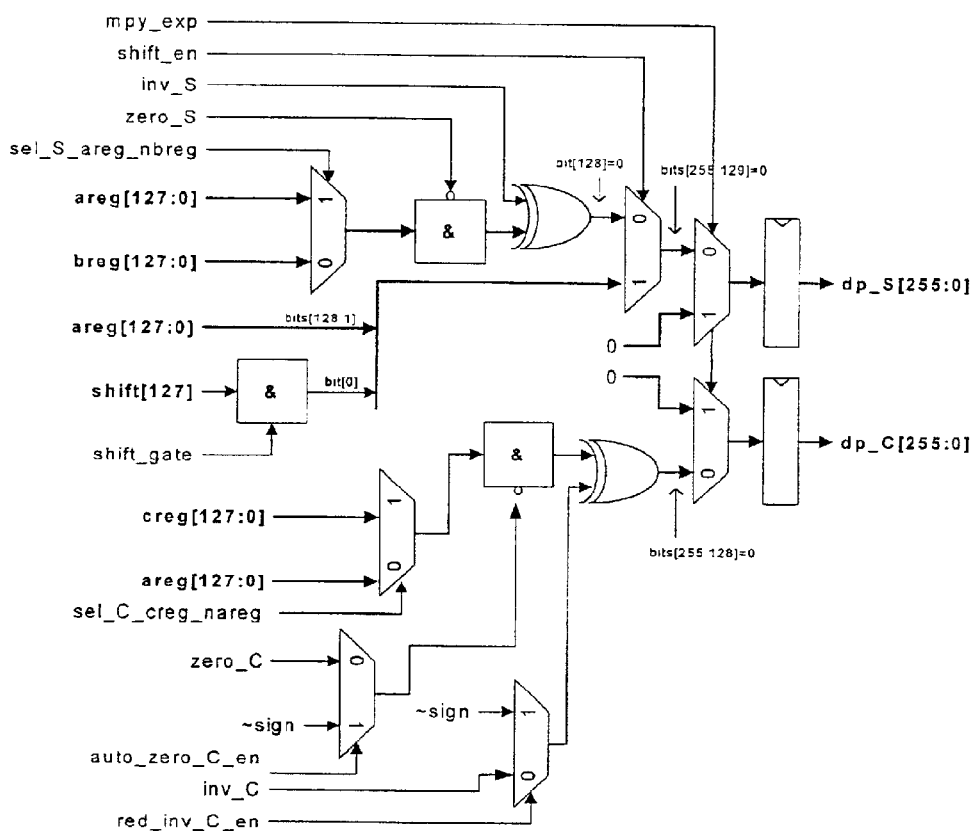
Figure 11:
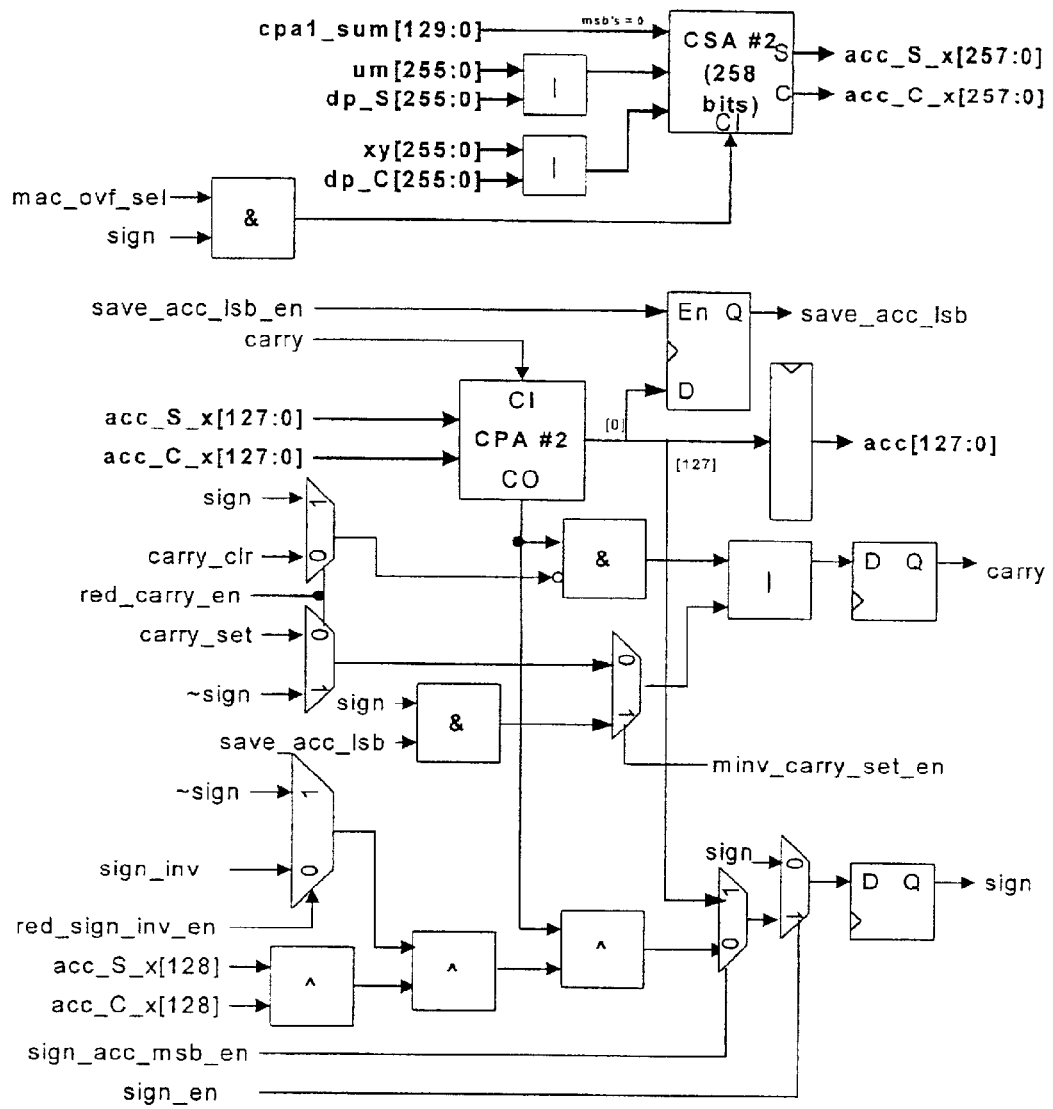

FIG. 6 is a high level block diagram of the Public Key Datapath block of FIG. 5. FIG. 7 is a block diagram of the scalar multiplier of FIG. 6. FIG. 8 is a block diagram of the vector multiplier (um) of FIG. 6. FIG. 9 is a block diagram of the vector multiplier (xy) of FIG. 6. FIGS. 10 and 11 are block diagrams of the accumulator of FIG. 6. Note that in FIG. 10, creg (m) is delayed 4 clocks which is one clock more than the multiplier latency. This aligns m with the output from the last multiplier digit. FIG. 12 is a diagram of a zero flag circuit that can produce the zero signal of FIG. 10.

Figure 13:
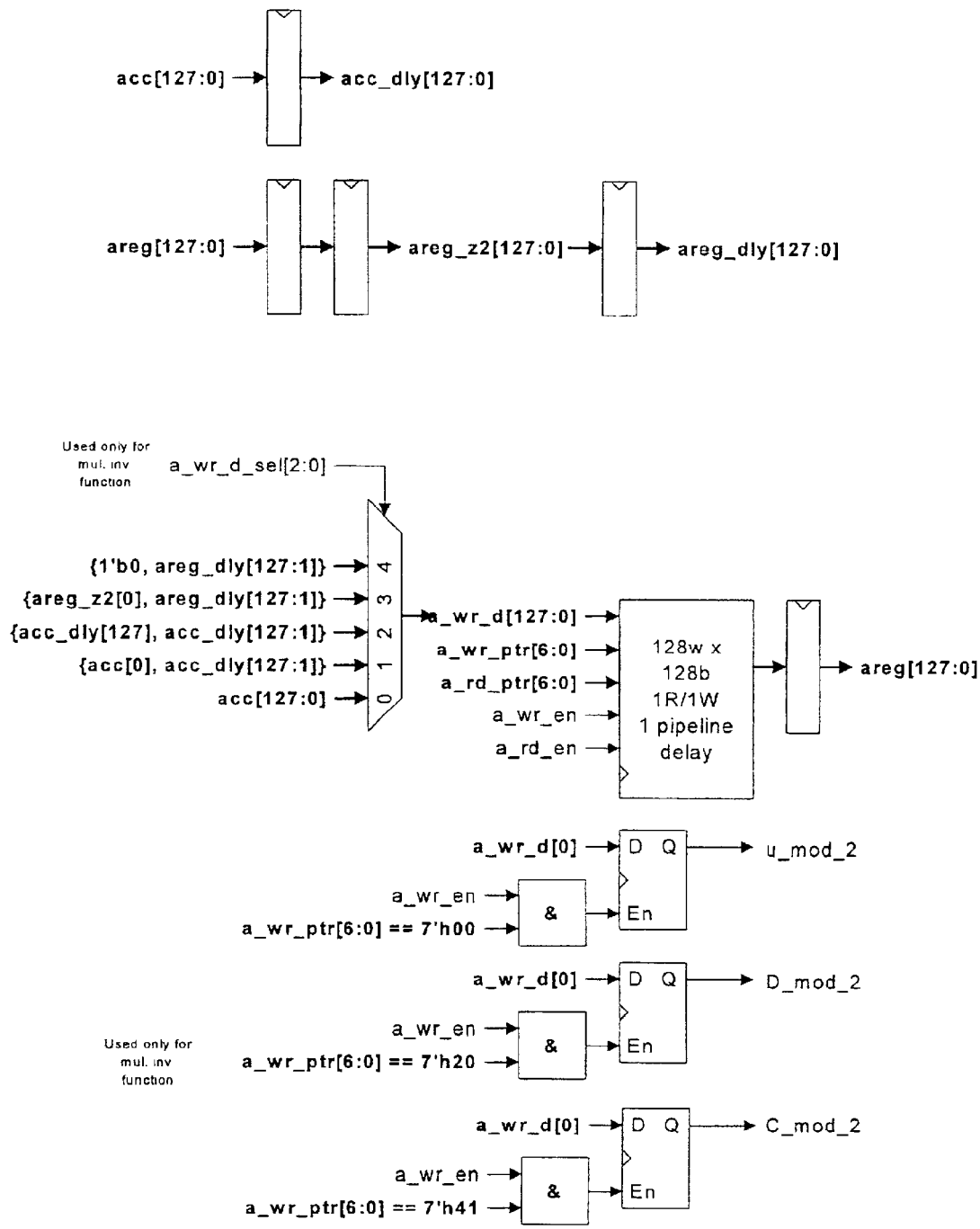
Figure 14:
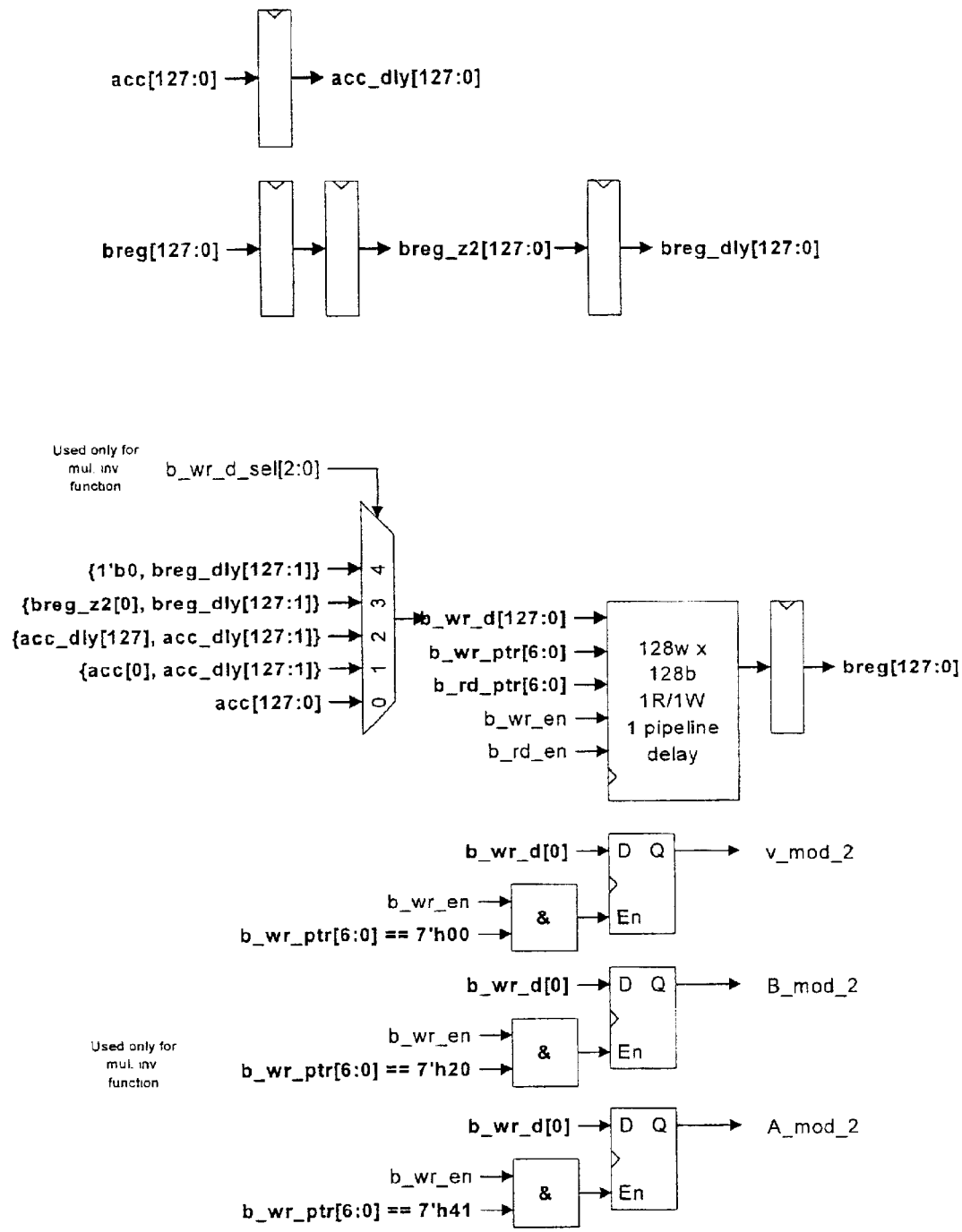

FIG. 13 is a diagram of the tempA register of FIG. 6. FIG. 14 is a diagram of the tempB register of FIG. 6. In FIG. 13, it will be noted that a purpose of delaying areg by two clock cycles is to simplify the control logic by matching the latency of (dp+acc). Also, in FIG. 14, it will be noted that a purpose of delaying breg by two clock cycles is to simplify the control logic by matching the latency of (dp+acc).

The operations that may be performed by the PKE of the Example, now will be described in detail. The operations are all defined with a parameter WORD_SIZE. The operations definitions are independent of the value of this parameter.

Mod

Mod (modulo) loads a into tempA. If (len[a]>len[m])&& ((len[a] mod WORD_SIZE)>(len[m] mod WORD_SIZE)), tempA is padded with one additional word of zeroes so that the msb of m is more significant than the msb of tempA. This implies that tempA must be at least (MAX_LENGTH_WORD_SIZE)+1 words long. This is done so that the non-restoring division algorithm does not overflow.

If len[a]=len[m], m is subtracted from tempA. If the result is negative, add back m and return the result to r. Else return the result to r. There are 4 operations. Each operation takes 5+(CEILING(len[m]/WORD_SIZE)−1) cycles to complete (5 is the latency from issuing the read command to completing the write command for the results of the operation on that word). Assume 16 clock cycles to read the command, and that new commands are read while the previous instruction is being executed. Therefore the execution time is: 16+4*[5+(CEILING(len[m]/WORD_SIZE)−1)] clock cycles.

If len[a]>len[m], m is subtracted from tempA followed by WORD_SIZE*CEILING((len[a]−len[m])/WORD_SIZE) non-restoring division steps. Each step includes either a subtraction or an addition, depending on the sign of the previous result. Each of these operations takes 5+(CEILING(len[m]/WORD_SIZE)−1) cycles to complete. Finally, if the sign of the remainder is negative, m is added back to tempA and returned to r. Else return the remainder in tempA to r. Therefore, the execution time is: 16+(5+CEILING(len[a]/WORD_SIZE))+(WORD_SIZE*CEILING((len[a]−len[m])/WORD_SIZE)+3)*(5+(CEILING(len[m]/WORD_SIZE)−1)).

R Mod m

R is defined as $2^{WORD\_SIZE*len[m]}$, and is internally generated by the Public Key Processor. The processor first loads −m into tempA, sets base, then calls modular reduction (R mod m=(R−m) mod m, which is bit smaller, and therefore fits within the maximum word width of MAX_LENGTH bits, even for len[m]=MAX_LENGTH bits). If (len[m] mod WORD_SIZE) !=0, tempA is padded with one additional word of zeroes so that the msb of m is more significant than the msb of tempA, and base=1. This is done so that the non-restoring division algorithm doesn't overflow. Else base=0.

If (len[m] mod WORD_SIZE)=0, m is subtracted from tempA. If the result is negative, add back m and return the result to r. Else return the result to r. There are 4 operations. Each operation takes 5+(CEILING(len[m]/WORD_SIZE)−1) cycles to complete (5 is the latency from issuing the read command to completing the write command for the results of the operation on that word). Assume 16 clock cycles to read the command, and that new commands are read while the previous instruction is being executed. Therefore the execution time is: 16+4*[5+(CEILING(len[m]/WORD_SIZE)−1)] clock cycles.

If (len[m] mod WORD_SIZE) !=0, there is one word of numerator (tempA) to be shifted into the partial remainder. Therefore there are WORD_SIZE non-restoring division steps. Each step includes either a subtraction or an addition, depending on the sign of the previous result. Each of these operations takes 5+(CEILING(len[m]/WORD_SIZE)−1) cycles to complete. Finally, if the sign of the remainder is negative, m is added back to tempA and returned to r. Else return the remainder in tempA to r. Therefore the execution time is: 16+(WORD_SIZE+4)*(5+(CEILING(len[m]/WORD_SIZE)−1))+1.

Addition

Addition loads a into tempA. Then b is added to tempA. TempA now equals a+b. Then subtract m from tempA. These operations include one extra word beyond the length of m to include a possible carry-out from a+b. If the result is negative, add back m and return the result to r. Else return the result to r. There are 5 operations. Each operation takes 5+(CEILING(len[m]/WORD_SIZE)) cycles to complete (5 is the latency from issuing the read command to completing the write command for the results of the operation on that word). Assume 16 clock cycles to read the command, and that new commands are read while the previous instruction is being executed. Therefore the execution time is: 16+5[5+(CEILING(len[m]/WORD_SIZE))] clock cycles.

Subtraction

Subtraction loads a into tempA, then subtracts b from tempA while setting the sign, tempA=a−b. If the result is negative, add back m and return the a−b+m to r. Else return a−b to r. There are 4 operations. Each operation takes 5+(CEILING(len[m]/WORD_SIZE)−1) cycles to complete (5 is the latency from issuing the read command to completing the write command for the results of the operation on that word). Assume 16 clock cycles to read the command, and that new commands are read while the previous instruction is being executed. Therefore the execution time is: 16+4[5+(CEILING(len[m]/WORD_SIZE)−1)] clock cycles.

Additive Inverse

Additive inverse negates a and loads it into tempA. If −a is negative, add m to tempA; else a=0, which is its own additive inverse, so don't add m to tempA. Return the result to r, r=−a mod m. There are 3 operations. Each operation takes 5+(CEILING(m_length/WORD_SIZE)−1) clock cycles to complete (5 is the latency from issuing the read command to completing the write command for the results of the operation on that word). Assume 16 clock cycles to read the command, and that new commands are read while the previous instruction is being executed. Therefore the execution time is (worst-case): 16+3[5+(CEILING(len[m]/WORD_SIZE)−1)] clock cycles.

Multiplication

Multiplication multiplies a*b into tempA, and then performs tempA mod m and returns the result. If CEILING((len[a]+len[b])/WORD_SIZE)<CEILING(len[m]/WORD_SIZE), zero-pad tempA up to CEILING(len[m]/WORD_SIZE). If ((len[a]+len[b])>len[m])&&(((len[a]+len[b]) mod WORD_SIZE)>(len[m] mod WORD_SIZE)), tempA is padded with one additional word of zeroes so that the msb of m is more significant than the msb of tempA (this is so that the non-restoring division algorithm does not overflow). This implies that temp must be at least (2*MAX_LENGTH/WORD_SIZE)+1 words long base=ceiling((a_len+b_len−m_len)÷WORD_SIZE). This is the offset of the lsw of m from tempA[0] that aligns the msw of m with the msw of temp.

The performance of the modulo function is described above, so here only the multiplication is described. Since a and b are both in the cache, and the cache only has one read port, only one digit from each word is read at a time. b is the multiplier, and a is the multiplicand. Each digit of b, starting from the lsw, is multiplied times all of a and stored in tempA. Each partial product is 1 digit longer than a. After the first partial product is stored, each successive partial product is added to the next partial product shifted up one digit. There are CEILING(len[b]/WORD_SIZE) multiplier digits, and each partial product takes 5+CEILING(len[a]/WORD_SIZE)+1 cycles to complete. Therefore the execution time for the multiplication step is CEILING(len[b])/WORD_SIZE)*(5+CEILING(len[a]/WORD_SIZE)+1) clock cycles. The execution time for the entire operation, including the modulus, is found by adding this value to the time for the modulus, where len[a']=len[a]+len[b]. Therefore the total execution time is (assuming len[a]+len[b]>len[m]), which is the worst-case: 16+CEILING(len[b]/WORD_SIZE)*(5+CEILING(len[a]/WORD_SIZE)+1)+WORD_SIZE*(CEILING((len[a]+len[b]−len[m])/WORD_SIZE)+2)*(5+(CEILING(len[m]/WORD_SIZE)−1)).

The size of the output of each digit and of the output of each loop should be known, in order to allocate adequate storage. Consider the multiplication of the first digit of the multiplier times the first digit of the multiplicand. In this case, the previous partial product=0. Therefore this partial result is: $=(2^{WORD\_SIZE}-1)*(2^{WORD\_SIZE}-1)=2^{2*WORD\_SIZE}-2^{WORD\_SIZE+1}+2^0$.

As the least-significant digit of this partial result is shifted out, and the remaining bits of this partial result are accumulated with the products of subsequent multiplicand digits, each following partial result is: $=(2^{2*WORD\_SIZE}-2^{WORD\_SIZE+1}+2^0)+(2^{WORD\_SIZE}-2^1)=2^{2*WORD\_SIZE}-2^{WORD\_SIZE}2^0$.

For subsequent multiplier digits previous partial product=0. Therefore, the partial result of a subsequent multiplier digit and the first multiplicand digit is: $=(2^{2*WORD\_SIZE}-2^{WORD\_SIZE+1}+2^0)+(2^{WORD\_SIZE}-2^0)=2^{2*WORD\_SIZE}-2^{WORD\_SIZE}$.

As the least-significant digit of this result is shifted out, and the remaining bits of this partial result are accumulated with the products of subsequent multiplicand digits, each following partial result is: $=(2^{2*WORD\_SIZE}-2^{WORD\_SIZE})+(2^{WORD\_SIZE}-2^0)=2^{2*WORD\_SIZE}-2^{2*WORD\_SIZE}-2^0$.

Therefore, the product of each multiplier and multiplicand digit accumulated with previous digits is 2 digits long. Each partial product is 1 digit longer than the multiplicand, and the length of the result is the sum of the digits in the multiplier and the multiplicand.

Multiplicative Inverse

Multiplicative inverse loads u=m and D=1 into tempA and v=a and B=0 into tempB. This takes 4*(5+CEILING(len[m]/128)−1)+2 clock cycles to complete. 5 clock cycles is the latency from issuing the read command to completing the write command for the results of the operation on that word. There are CEILING(len[m]/128) words in u and v but CEILING(len[m]/128)+1 words in B and D. There is a guard word added to the top of B and D to avoid overflow in the intermediate results. The algorithm uses in the worst case 4*(len[m]+1) outer loop iterations, where each inner loop uses 5 operations. The first two operations take 2*(6+CEILING(len[m]/128) cycles. For these first two operations, the result is stored >>1, which adds one extra clock cycle to the latency. The other three operations take 3*(5+(CEILING(len[m]/128)−1))+1 cycles to complete. Finally, there are four operations to convert D to the output. These take 4*(5+(CEILING(len[m]/128)−1))+1 cycles to complete. Assume 16 clock cycles to read the command, and that new commands are read while the previous instruction is being executed. Therefore the execution time is: 16+8*(5+(CEILING(len[m]/128)−1))+3+4*(len[m]+1)*(2*[6+CEILING(len[m]/128)]+3*[5+(CEILING(len[m]/128)−1)]+1) clock cycles.

Exponentiation

Exponentiation first copies g*R mod m into tempB twice, then performs Montgomery exponentiation. This uses len[exponent]+HammingWeight[exponent] Montgomery multiplies, where len[exponent] is the number of significant bits in the exponent. For random numbers, this can be very close to 1.5*len[exponent]. The Montgomery multiplication algorithm is implemented according to the above-cited Menezes et al. reference. Each digit of the multiplier is multiplied times the multiplicand and added to the previous partial result, producing an n+1 digit partial result. The top n digits are stored (actually an n+1 digit+1 bit result: the overflow bit is stored in a register in the datapath). The least significant digit of each partial result is fed back to the scalar multiplier for the next result via a sneak path, so this need not add any delay or latency to the result. However, the first digit uses an extra multiplier latency to fill the pipeline. At the end of each multiplication, subtract m from the result (this subtraction is folded into the last loop iteration). If the result is negative add back m, else continue. Finally, copy the result to r. Therefore, the total execution time is: 16+3*(5+(CEILING(len[m]/128)−1))+1.5*len[exponent]*{12+(CEILING(len[m]/128)*(CEILING((len[m])/128)+1)+(5+(CEILING(len[m]128)−1)}.

The Montgomery exponentiation algorithm is according to the above-cited Menezes, et al. reference, and modified to eliminate extraneous multiplies. The Montgomery multiplication algorithm is also according to the above-cited Menezes et al. reference. This is a highly parallel version of the Montgomery algorithm. The hardware is designed to exploit the parallelism of this algorithm. It executes the inner loop with minimum latency and the maximum possible throughput, which may be limited mainly by the multipliers. The algorithm operates on digits of the numbers. Each number is divided into n digits of WORD_SIZE length. The inputs are the modulus m, a multiplier x and a multiplicand y, each of which is mod m, $R=2^{n*WORD\_SIZE}$, and m'=−m$[0]^{-1}$ mod $2^{WORD\_SIZE}$.

```
A = 0;
for i from 0 to n − 1 do {
    u[i] = ((A[0] + x[i] * y[0]) * m') mod 2^WORD_SIZE;
    for j from 0 to n − 1 do
        A'[j] = (A[j] + x[i] * y[j] + u[i] * m[j])/2^WORD_SIZE;
    }
    if A = m {
        A = A − m;
    }
    return (A);
```

The vector multiplication in the second step of the loop is performed one digit of the multiplicand at a time. The size of the output of each digit and of the output of each loop should be known to allocate adequate storage. Consider the multiplication of the first digit of the multiplier times the first digit of the multiplicand. In this case, A=0. Therefore this partial result is: $=2^1*(2^{WORD\_SIZE}-1)*(2^{WORD\_SIZE}-1)=2^{2*WORD\_SIZE+1}-2^{WORD\_SIZE+2}+2^1$.

As the least-significant digit of this partial result is shifted out, and the remaining bits of this partial result are accumulated with the products of subsequent multiplicand digits, each following partial result is: $=(2^{2*WORD\_SIZE+1}-2^{WORD\_SIZE+2}+2^1)+(2^{WORD\_SIZE+1}-2^2)=2^{2*WORD\_SIZE+1}-2^{WORD\_SIZE+1}-2^1$.

Therefore, each the result of each digit multiplication is 2*WORD_SIZE+1 bits long, and the result of the first step of the loop before the division by $2^{WORD\_SIZE}$ is (n+1)*WORD_SIZE+1 bits long. For subsequent multiplier digits A=0. Therefore, the partial result of a subsequent multiplier digit and the first multiplicand digit is: $=(2^{2*WORD\_SIZE+1}-2^{WORD\_SIZE+2}+2^1)+(2^{WORD\_SIZE}-2^0)=2^{2*WORD\_SIZE+1}-2^{WORD\_SIZE+1}-2^{WORD\_SIZE}+2^0$.

As the least-significant digit of this result is shifted out, and the remaining bits of this partial result are accumulated with the products of subsequent multiplicand digits, each following partial result is: $=(2^{2*WORD\_SIZE+1}-2^{WORD\_SIZE+}1-2^{WORD\_SIZE}+2^0)+(2^{WORD\_SIZE+1}-2^1-2^0)=2^{2*WORD\_SIZE}-2^1$.

This result is consistent with the final step of the Montgomery multiplication algorithm. If the size of the result were any larger, than A−m could not equal $xyR^{-1}$ mod m. It allows saving only n+1 digits per multiplier digit, rather than n+2, by using a single register and small amount of logic to save the overflow bit from each loop iteration. That bit is added to the most-significant product of the next multiplier digit. This fact also can be used while folding the comparison of A with m into the last loop iteration. Since a positive number is being subtracted from another positive number, the sign=0^1^carry out of the most-significant bit. This result indicates which is the most-significant bit.

The hardware implementation overlaps the vector multiplication at the end of leach loop iteration with the scalar multiplies at the beginning of the next. First, y[0] is loaded. Then, x[0] is loaded, and u[0]=x[0]*y[0]. At this point, there is no previous partial result, so u[0]=u[0]*m'. In the next clock cycle, x[1] is loaded into the scalar multiplier and x[0] is pipelined into the vector multiplier while u[i] is loaded into the vector multiplier. When the vector multiplier produces the first digit of the result, it is loaded into the scalar multiplier to produce u[1]=u[1]*a[0]. Since all of the multipliers should have the same latency, as long as the latency through the scalar multiplier times two is ≦ the number of digits in the multiplicand, the latency of the scalar multiplier need only appear before the first vector multiply, and can be hidden thereafter. If not, then the performance may only square linearly, rather than as the square, for "small" numbers.

```
task montgomery_multiplication( );
/* Do the Montgomery multiplication, including the test
   and correction for A=m. base points to the multiplier,
   either gR mod m or A, the intermediate exponentiation
   result. The multiplicand is always A. If the base register
   points to gR mod m, the operation is a multiplication,
   and if the base register points to A, the operation is a
   squaring. */
endtask // montgomery_multiplication
```

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A Montgomery exponentiator that modulo exponentiates a generator to a power of an exponent, the Montgomery exponentiator comprising:
    a first multiplier that is configured to repeatedly square a residue of the generator to produce a series of first multiplier output values at a first multiplier output; and
    a second multiplier that is configured to multiply selected ones of the series of first multiplier output values that correspond to a bit of the exponent that is a predetermined binary value, by a partial result, to produce a series of second multiplier output values at a second multiplier output.

2. A Montgomery exponentiator according to claim 1 further comprising:
    a first register that is coupled to the second multiplier output, and is configured to serially store the series of second multiplier output values to thereby provide the partial result; and
    a second register that is coupled to the first multiplier output, and is configured to serially store the series of first multiplier output values and to serially provide the series of first multiplier values to the first and second multipliers.

3. A Montgomery exponentiator according to claim 2 wherein the first register is further configured to be initialized to the first binary value and wherein the second register is further configured to be initialized to the residue of the generator.

4. A Montgomery exponentiator according to claim 1 wherein each of the first and second multipliers comprises a Montgomery multiplier that modulo multiplies a residue multiplicand by a residue multiplier to obtain a residue product, each Montgomery multiplier comprising:
    a scalar multiplier that is configured to multiply a least significant digit of the multiplicand by a first selected digit of the multiplier to produce a scalar multiplier output;
    a first vector multiplier that is configured to multiply the scalar multiplier output by a modulus to produce a first vector multiplier output;
    a second vector multiplier that is configured to multiply a second selected digit of the multiplier by the multiplicand to produce a second vector multiplier output; and
    an accumulator that is configured to add the first vector multiplier output and the second vector multiplier output to produce a product output.

5. A Montgomery exponentiator according to claim 4 wherein the scalar multiplier is further configured to multiply the least significant digit of the multiplicand by the first selected digit of the multiplier and by one over a negative of a least significant digit of the modulus to produce the scalar multiplier output.

6. A Montgomery exponentiator according to claim 5 further comprising a first multiplexer that is configured to multiplex the least significant digit of the multiplicand and one over the negative of the least significant digit of the modulus into the scalar multiplier.

7. A Montgomery exponentiator according to claim 4 further comprising a first feedback path that is configured to feed the scalar multiplier output back into the scalar multiplier.

8. A Montgomery exponentiator according to claim 4 further comprising a second feedback path that is configured to feed the product output back into the scalar multiplier.

9. A Montgomery exponentiator according to claim 7 further comprising a second feedback path that is configured to feed the product output back into the scalar multiplier.

10. A Montgomery exponentiator according to claim 4 wherein the first selected digit of the multiplier is different from the second selected digit of the multiplier.

11. A Montgomery exponentiator that modulo exponentiates a generator to a power of an exponent, the Montgomery exponentiator comprising:
    a first multiplier that is configured to be responsive to a residue of the generator and that includes a first multiplier output;
    a second multiplier that is configured to be responsive to the first multiplier output and that includes a second multiplier output;
    a first register that is coupled to the second multiplier output, the second multiplier further being responsive to the first register; and
    a second register that is coupled to the first multiplier output, the first multiplier further being responsive to the second register and the second multiplier being responsive to the first multiplier output via the second register.

12. A Montgomery exponentiator according to claim 11 further comprising:
    a controller that is configured to cause the first multiplier to square contents of the second register and to cause the second multiplier to multiply the contents of the second register by contents of the first register if a selected bit of the exponent is a predetermined binary value and to refrain from multiplying the contents of the second register by the contents of the first register if the selected bit of the exponent is not the predetermined binary value.

13. A Montgomery exponentiator according to claim 12 wherein the first register is configured to be initialized to the first binary value and wherein the second register is configured to be initialized to the residue of the generator.

14. A Montgomery exponentiator according to claim 12 wherein each of the first and second multipliers comprises a Montgomery multiplier that modulo multiplies a residue multiplicand by a residue multiplier to obtain a residue product, each Montgomery multiplier comprising:
    a scalar multiplier;
    a first vector multiplier;
    a second vector multiplier; and
    wherein the controller is configured to control the scalar multiplier, the first vector multiplier and the second vector multiplier to overlap scalar multiplies using a selected digit of the multiplier and vector multiplies using a modulus and the multiplicand.

15. A Montgomery exponentiator according to claim 14 wherein the controller is further configured to control the scalar multiplier to perform a scalar multiply using a least significant digit of the multiplier prior to controlling the vector multipliers to perform the vector multiplies using the modulus and the multiplicand.

16. A Montgomery exponentiator according to claim 14 wherein the controller is further configured to control the scalar multiplier to multiply a least significant digit of the multiplicand by a first selected digit of the multiplier to produce a scalar multiplier output, to control the first vector multiplier to multiply the scalar multiplier output by the modulus to produce a first vector multiplier output and to control the second vector multiplier to multiply a second selected digit of the multiplier by the multiplicand to produce a second vector multiplier output.

17. A Montgomery exponentiator according to claim 16 the controller is further configured to control the scalar multiplier to multiply the least significant digit of the multiplicand by the first selected digit of the multiplier by and one over a negative of a least significant digit of a modulus to produce the scalar multiplier output.

18. A Montgomery exponentiator according to claim 17 wherein the controller is further configured to multiplex the least significant digit of the multiplicand and one over the negative of the least significant digit of the modulus into the scalar multiplier.

19. A Montgomery exponentiation method that modulo exponentiates a generator to a power of an exponent, the Montgomery exponentiation method comprising:

repeatedly squaring a residue of the generator in a first multiplier, to produce a series of first multiplier output values; and multiplying selected ones of the series of first multiplier output values that correspond to a bit of the exponent that is a predetermined binary value, by a partial result in a second multiplier, to produce a series of second multiplier output values.

20. A method according to claim 19 further comprising:

serially storing the series of second multiplier output values to thereby provide the partial result; and serially storing the series of first multiplier output values and providing the serially stored series of first multiplier values to the first and second multipliers.

21. A method according to claim 19 wherein each of the first and second multipliers performs a Montgomery multiplication method that modulo multiplies a residue multiplicand by a residue multiplier to obtain a residue product, each Montgomery multiplication method comprising:

multiplying a least significant digit of the multiplicand by a first selected digit of the multiplier in a scalar multiplier to produce a scalar multiplier output;

multiplying the scalar multiplier output by a modulus in a first vector multiplier to produce a first vector multiplier output;

multiplying a second selected digit of the multiplier by the multiplicand in a second vector multiplier to produce a second vector multiplier output; and adding the first vector multiplier output and the second vector multiplier output to produce a product output.

22. A method according to claim 21 further comprising multiplying the least significant digit of the multiplicand by the first selected digit of the multiplier and by one over a negative of a least significant digit of the modulus in the scalar multiplier to produce the scalar multiplier output.

23. A method according to claim 22 further comprising multiplexing the least significant digit of the multiplicand and one over the negative of the least significant digit of the modulus into the scalar multiplier.

24. A method according to claim 21 further comprising feeding the scalar multiplier output back into the scalar multiplier.

25. A method according to claim 24 further comprising feeding the product output back into the scalar multiplier.

26. A method according to claim 21 further comprising feeding the product output back into the scalar multiplier.

27. A Montgomery exponentiation method that modulo exponentiates a generator to a power of an exponent using a first multiplier that is configured to be responsive to a residue of the generator and that includes a first multiplier output, a second multiplier that is configured to be responsive to the first multiplier output and that includes a second multiplier output, a first register that is coupled to the second multiplier output, the second multiplier further being responsive to the first register, and a second register that is coupled to the first multiplier output, the first multiplier further being responsive to the second register and the second multiplier being responsive to the first multiplier output via the second register, the Montgomery exponentiation method comprising:

controlling the first multiplier to square contents of the second register;

controlling the second multiplier to multiply the contents of the second register by contents of the first register if a selected bit of the exponent is a predetermined binary value and to refrain from multiplying the contents of the second register by the contents of the first register if the selected bit of the exponent is not the predetermined binary value.

28. A method according to claim 27 further comprising:

initializing the first register to the first binary value; and
initializing the second register to the residue of the generator.

29. A method according to claim 27 wherein each of the first and second multipliers performs a Montgomery multiplication method that modulo multiplies a residue multiplicand by a residue multiplier to obtain a residue product, each Montgomery multiplication method using a scalar multiplier, a first vector multiplier, and a second vector multiplier, the Montgomery multiplication method comprising:

controlling the scalar multiplier, the first vector multiplier and the second vector multiplier to overlap scalar multiplies using a selected digit of the multiplier and vector multiplies using a modulus and the multiplicand.

30. A method according to claim 29 further comprising controlling the scalar multiplier to perform a scalar multiply using a least significant digit of the multiplier prior to controlling the vector multipliers to perform the vector multiplies using the modulus and the multiplicand.

31. A method according to claim 29 wherein the controlling comprises:

controlling the scalar multiplier to multiply a least significant digit of the multiplicand by a first selected digit of the multiplier to produce a scalar multiplier output;

controlling the first vector multiplier to multiply the scalar multiplier output by the modulus to produce a first vector multiplier output; and controlling the second vector multiplier to multiply a second selected digit of the multiplier by the multiplicand to produce a second vector multiplier output.

32. A method according to claim 31 further comprising controlling the scalar multiplier to multiply the least significant digit of the multiplicand by the first selected digit of the multiplier and by one over a negative of a least significant digit of a modulus to produce the scalar multiplier output.

33. A method according to claim 32 further comprising multiplexing the least significant digit of the multiplicand and one over the negative of the least significant digit of the modulus into the scalar multiplier.

34. A public key engine that calculates functions of large numbers modulo another large number, the public key engine comprising:

a Montgomery exponentiator that modulo exponentiates a generator to a power of an exponent, the Montgomery exponentiator comprising:

a first multiplier that is configured to be responsive to a residue of the generator and that includes a first multiplier output;

a second multiplier that is configured to be responsive to the first multiplier output and that includes a second multiplier output;

a first register that is coupled to the second multiplier output, the second multiplier further being responsive to the first register; and a second register that is coupled to the first multiplier output, the first multiplier further being responsive to the second register, and the second multiplier being responsive to the first multiplier output via the second register.

35. A public key engine according to claim 34 wherein the Montgomery exponentiator further comprises:

a controller that is configured to cause the first multiplier to square contents of the second register and to cause the second multiplier to multiply the contents of the second register by contents of the first register if a selected bit of the exponent is a predetermined binary value and to refrain from multiplying the contents of the second register by the contents of the first register if the selected bit of the exponent is not the predetermined binary value.

36. A public key engine according to claim 35 wherein the first register is configured to be initialized to the first binary value and wherein the second register is configured to be initialized to the residue of the generator.

37. A public key engine according to claim 35 wherein each of the first and second multipliers comprises a Montgomery multiplier that modulo multiplies a residue multiplicand by a residue multiplier to obtain a residue product, each Montgomery multiplier comprising:

a scalar multiplier;

a first vector multiplier;

a second vector multiplier; and wherein the controller is configured to control the scalar multiplier, the first vector multiplier and the second vector multiplier to overlap scalar multiplies using a selected digit of the multiplier and vector multiplies using a modulus and the multiplicand.

38. A public key engine according to claim 37 wherein the controller is further configured to control the scalar multiplier to perform a scalar multiply using a least significant digit of the multiplier prior to controlling the vector multipliers to perform the vector multiplies using the modulus and the multiplicand.

39. A public key engine according to claim 37 wherein the controller is further configured to control the scalar multiplier to multiply a least significant digit of the multiplicand by a first selected digit of the multiplier to produce a scalar multiplier output, to control the first vector multiplier to multiply the scalar multiplier output by the modulus to produce a first vector multiplier output and to control the second vector multiplier to multiply a second selected digit of the multiplier by the multiplicand to produce a second vector multiplier output.

40. A public key engine according to claim 39 the controller is further configured to control the scalar multiplier to multiply the least significant digit of the multiplicand by the first selected digit of the multiplier by and one over a negative of a least significant digit of a modulus to produce the scalar multiplier output.

41. A public key engine according to claim 40 wherein the controller is further configured to multiplex the least significant digit of the multiplicand and one over the negative of the least significant digit of the modulus into the scalar multiplier.

42. A public key engine according to claim 34 further comprising a modulo function generator.

43. A public key engine according to claim 34 further comprising a Chinese Remainder Theorem computer that is configured to use the first multiplier and the second multiplier.

* * * * *